United States Patent
Kato

(10) Patent No.: US 10,859,506 B2
(45) Date of Patent: Dec. 8, 2020

(54) IMAGE PROCESSING SYSTEM FOR PROCESSING IMAGE DATA GENERATED IN DIFFERENT LIGHT EMISSION STATES, NON-TRANSITORY COMPUTER READABLE RECORDING MEDIUM, AND IMAGE PROCESSING METHOD

(71) Applicant: OMRON Corporation, Kyoto (JP)

(72) Inventor: Yutaka Kato, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 97 days.

(21) Appl. No.: 16/162,408

(22) Filed: Oct. 17, 2018

(65) Prior Publication Data

US 2019/0187064 A1    Jun. 20, 2019

(30) Foreign Application Priority Data

Dec. 15, 2017  (JP) .................................. 2017-240594

(51) Int. Cl.
| | | |
|---|---|---|
| *G06K 9/00* | (2006.01) | |
| *G01N 21/88* | (2006.01) | |
| *G01B 11/25* | (2006.01) | |
| *G01B 11/245* | (2006.01) | |
| *G06K 9/20* | (2006.01) | |

(52) U.S. Cl.
CPC .......... *G01N 21/88* (2013.01); *G01B 11/245* (2013.01); *G01B 11/25* (2013.01); *G06K 9/00201* (2013.01); *G06K 9/2018* (2013.01); *G06K 9/2027* (2013.01); *G01N 2201/121* (2013.01); *G06K 2209/19* (2013.01)

(58) Field of Classification Search
None
See application file for complete search history.

(56) References Cited

U.S. PATENT DOCUMENTS

| | | | |
|---|---|---|---|
| 8,005,263 B2* | 8/2011 | Fujimura | ................ G06F 3/017 382/103 |
| 9,571,818 B2* | 2/2017 | Pulli | .................... H04N 13/254 |
| 2001/0046316 A1* | 11/2001 | Miyano | ................ A61B 5/7425 382/154 |

(Continued)

FOREIGN PATENT DOCUMENTS

| | | |
|---|---|---|
| CN | 102654466 | 9/2012 |
| CN | 103444165 | 12/2013 |

(Continued)

OTHER PUBLICATIONS

Search Report of Europe Counterpart Application, dated Apr. 5, 2019, p. 1-p. 8.

(Continued)

*Primary Examiner* — Jayesh A Patel
(74) *Attorney, Agent, or Firm* — JCIPRNET

(57) ABSTRACT

It is to perform image measurement under appropriate conditions according to a position in image data. An image processing device acquires a plurality of pieces of image data generated by imaging in a plurality of different light emission states of a plurality of light emitting units included in an illumination device. The image processing device generates image data to be used for image measurement on the basis of the plurality of pieces of acquired image data and a generation condition defined in association with the position in the image data.

11 Claims, 14 Drawing Sheets

(56) References Cited

U.S. PATENT DOCUMENTS

| | | | |
|---|---|---|---|
| 2008/0123937 A1* | 5/2008 | Arias Estrada | G06T 7/593 382/154 |
| 2008/0143823 A1* | 6/2008 | Jin | G03H 1/0005 348/44 |
| 2010/0110180 A1 | 5/2010 | Tonogai et al. | |
| 2012/0026293 A1* | 2/2012 | Gruetzmann | G01B 11/275 348/46 |
| 2012/0155748 A1* | 6/2012 | Shin | G06T 7/593 382/154 |
| 2013/0202190 A1* | 8/2013 | Niu | H04N 13/122 382/154 |
| 2013/0335560 A1 | 12/2013 | Higashiura et al. | |
| 2014/0192158 A1* | 7/2014 | Whyte | G06T 7/593 348/46 |
| 2014/0218520 A1* | 8/2014 | Teich | H04N 5/2354 348/143 |
| 2014/0307953 A1* | 10/2014 | Kirk | G06F 3/0683 382/154 |
| 2015/0085080 A1* | 3/2015 | Hollenbeck | G01B 11/2545 348/47 |
| 2015/0355102 A1* | 12/2015 | Kido | G01N 21/8806 348/46 |
| 2016/0261791 A1 | 9/2016 | Satoyoshi | |

FOREIGN PATENT DOCUMENTS

| | | | |
|---|---|---|---|
| CN | 104279978 | | 1/2015 |
| CN | 105184765 | | 12/2015 |
| CN | 106796721 | | 5/2017 |
| JP | 2014206388 A | * | 10/2014 |
| JP | 2015232487 | | 12/2015 |

OTHER PUBLICATIONS

"Office Action of China Counterpart Application", dated Aug. 21, 2020, with English translation thereof, p. 1-p. 23.

* cited by examiner

O→O': Translational component T

IMAGE PROCESSING SYSTEM FOR PROCESSING IMAGE DATA GENERATED IN DIFFERENT LIGHT EMISSION STATES, NON-TRANSITORY COMPUTER READABLE RECORDING MEDIUM, AND IMAGE PROCESSING METHOD

CROSS-REFERENCE TO RELATED APPLICATION

This application claims the priority benefit of Japan Application No. 2017-240594, filed on Dec. 15, 2017. The entirety of the above-mentioned patent application is hereby incorporated by reference herein and made a part of this specification.

BACKGROUND

Technical Field

The disclosure relates to an image processing system, a computer readable recording medium, and an image processing method.

Description of Related Art

In the field of factory automation (FA) or the like, an image processing technology for imaging a target (hereinafter also referred to as a "workpiece") under illumination using light from an illumination device, and acquiring information on the workpiece from generated image data has been used.

A variety of illumination devices have been developed as illumination devices to be used in the field of image processing technology. For example, Japanese Patent Application Laid-Open No. 2015-232487 (Patent Document 1) discloses an illumination device including a plurality of illuminations having different illumination directions.

In an illumination device including a plurality of illuminations, an incidence angle of light radiated from one illumination differs between surface regions according to a surface shape of a target. Accordingly, even when the same target is irradiated with light from the same illumination, it is conceivable that the accuracy of image measurement performed on the basis of the light differs between the surface regions. For example, it is conceivable that even when a surface shape of one region can be obtained accurately under the same illumination conditions, measurement accuracy of a surface shape of the other region is degraded.

The inventor has found that an optimal illumination condition differs between surface regions of the same target, and therefore, it is necessary to perform image measurement under appropriate conditions according to a position in image data corresponding to the surface region.

SUMMARY

According to an example of the present disclosure, an image processing system that performs image measurement is provided. Then image processing system includes an imaging unit that images a target and generates image data; an illumination unit in which a plurality of light emitting units for irradiating the target with illumination light are disposed; and a generation unit that acquires a plurality of pieces of image data generated by the imaging unit imaging the target in a plurality of different light emission states of the plurality of light emitting units, and generates image data to be used for the image measurement on the basis of the plurality of pieces of acquired image data and a generation condition defined in association with a position in the image data.

According to another example of the present disclosure, there is provided a computer readable recording medium comprising an image processing program for performing image measurement that is executed by a computer that controls an imaging device that images a target and outputs image data and an illumination device in which a plurality of light emitting units for irradiating the target with illumination light are disposed. The image processing program enables the computer to execute: a function of acquiring a plurality of pieces of image data generated by the imaging device imaging the target in a plurality of different light emission states of the plurality of light emitting units, and a function of generating image data to be used for the image measurement on the basis of the plurality of pieces of acquired image data and a generation condition defined in association with a position in the image data.

According to still another example of the present disclosure, there is provided an image processing method for performing image measurement. The image processing method includes: making a plurality of light emission states of a plurality of light emitting units different; acquiring a plurality of pieces of image data by imaging a target in the plurality of different light emission states; and generating image data to be used for the image measurement on the basis of the plurality of pieces of acquired image data and a generation condition defined in association with a position in the image data.

DESCRIPTION OF THE EMBODIMENTS

Figure 1:
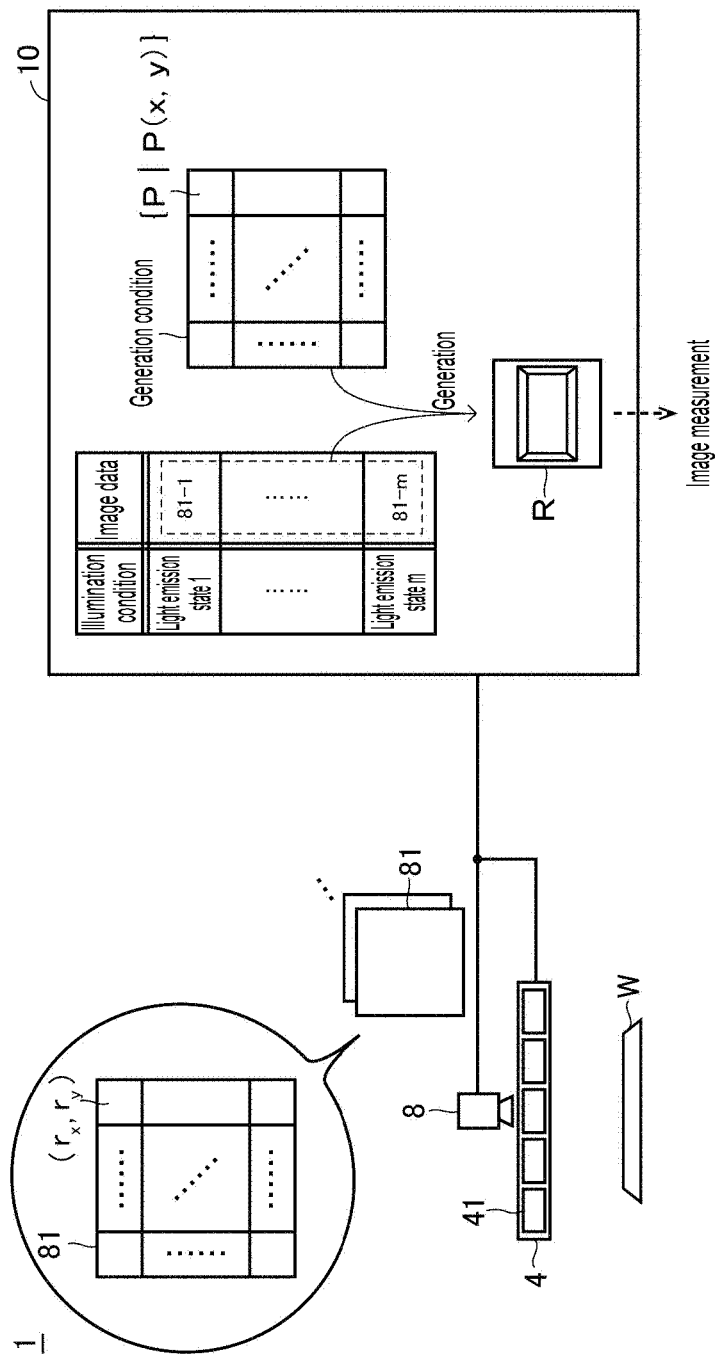
FIG. 1 is a diagram schematically illustrating a situation in which an image processing system 1 according to an embodiment is applied.

The present disclosure provides an image processing system, an image processing program, and an image processing method capable of performing image measurement under appropriate conditions according to a position in image data, as described above.

According to an example of the present disclosure, an image processing system that performs image measurement is provided. Then image processing system includes an imaging unit that images a target and generates image data; an illumination unit in which a plurality of light emitting units for irradiating the target with illumination light are disposed; and a generation unit that acquires a plurality of pieces of image data generated by the imaging unit imaging the target in a plurality of different light emission states of the plurality of light emitting units, and generates image data to be used for the image measurement on the basis of the plurality of pieces of acquired image data and a generation condition defined in association with a position in the image data.

According to this disclosure, since the image data to be used for image measurement is generated on the basis of the generation condition defined in association with the position in the image data, it is possible to perform the image measurement under appropriate conditions according to the position in the image data.

In the above disclosure, the generation condition may be defined for each partial region including a plurality of adjacent pixels in the image data. The generation unit may generate partial region image data corresponding to the partial region for each partial region as image data to be used for the image measurement.

According to this disclosure, since the partial region image data is generated for each partial region including a plurality of pixels, processing is reduced as compared with a case in which the partial region image data is generated for each pixel.

In the above disclosure, the generation unit may generate the image data to be used for the image measurement by combining a plurality of partial region image data generated for each partial region into one piece of image data.

According to this disclosure, it is possible to reduce processing as compared with a case in which the image measurement is performed on each partial region image data.

In the above disclosure, the generation unit may include a control unit that controls the illumination unit so that one of the plurality of light emitting units sequentially emits light, and controls the imaging unit so that the target is imaged in correspondence to the sequential light emission of the light emitting units, and a combination processing unit that extracts partial image data corresponding to the partial region of a generation target from the plurality of pieces of image data generated by the imaging unit, and combines the plurality of pieces of extracted partial image data according to a first parameter set in which an influence of each light emitting unit has been defined for each partial region to generate the partial region image data.

According to this disclosure, it is possible to generate the partial region image data in consideration of an influence of each light emitting unit for each partial region. Thus, it is possible to generate appropriate partial region image data for each partial region, and to perform image measurement under appropriate conditions for each region.

In the above disclosure, the generation unit may further include a position specifying unit that specifies a disposition situation of the target from the image data, and a parameter correction unit that compares the disposition situation of the target specified by the position specifying unit with a disposition situation of a reference target at the time of acquisition of the first parameter set to obtain the amount of movement of the target, and corrects the first parameter set on the basis of the amount of movement.

According to this disclosure, even when the disposition situation of the target that is a measurement target is changed to a disposition situation of the target at the time of acquiring the first parameter set, the first parameter set can be corrected according to the change.

In the above disclosure, the generation unit may include a control unit that controls the illumination unit according to a second parameter set that defines the plurality of light emission states, and controls the imaging unit so that the imaging unit images the target in each light emission state, and a generation processing unit that extracts partial image data corresponding to the partial region of a generation target from at least one piece of image data among the plurality of pieces of image data generated by the imaging unit and generates the partial region image data on the basis of the extracted partial image data.

According to this disclosure, it is possible to perform the image measurement in an appropriate light emission state according to the partial region.

In the above disclosure, the generation unit may further include a position specifying unit that specifies a disposition situation of the target from the image data, and a parameter correction unit that compares the disposition situation of the target specified by the position specifying unit with a disposition situation of a reference target at the time of acquisition of the second parameter set to obtain the amount of movement of the target, and corrects the second parameter set on the basis of the amount of movement.

According to this disclosure, even when the disposition situation of the target that is a measurement target is changed to a disposition situation of the target at the time of acquiring the second parameter set, the second parameter set can be corrected according to the change.

In the above disclosure, the parameters included in the first parameter set may include negative values.

According to this disclosure, it is possible to eliminate an influence of predetermined light emitting units and generate the partial region image data.

In the above disclosure, the partial region is defined on the basis of a shape of the target. According to this disclosure, it is possible to perform the image measurement under illumination conditions corresponding to the surface of the target.

In the above disclosure, the plurality of light emitting units may be regularly provided in the illumination unit with reference to a predetermined position.

According to this disclosure, when the first parameter or the second parameter is corrected, the parameters can be corrected according to a predetermined rule by the light emitting units being regularly disposed.

According to another example of the present disclosure, there is provided a computer readable recording medium comprising an image processing program for performing image measurement that is executed by a computer that controls an imaging device that images a target and outputs image data and an illumination device in which a plurality of light emitting units for irradiating the target with illumination light are disposed. The image processing program enables the computer to execute: a function of acquiring a plurality of pieces of image data generated by the imaging device imaging the target in a plurality of different light emission states of the plurality of light emitting units, and a function of generating image data to be used for the image measurement on the basis of the plurality of pieces of acquired image data and a generation condition defined in association with a position in the image data.

According to this disclosure, since the image data to be used for image measurement is generated on the basis of the generation condition corresponding to the position in the image data, the image measurement can be performed under appropriate conditions according to the position in the image data.

According to still another example of the present disclosure, there is provided an image processing method for performing image measurement. The image processing method includes: making a plurality of light emission states of a plurality of light emitting units different; acquiring a plurality of pieces of image data by imaging a target in the plurality of different light emission states; and generating image data to be used for the image measurement on the basis of the plurality of pieces of acquired image data and a generation condition defined in association with a position in the image data.

According to this disclosure, since the image data to be used for image measurement is generated on the basis of the generation condition corresponding to the position in the image data, the image measurement can be performed under appropriate conditions according to the position in the image data.

It is possible to perform image measurement under appropriate conditions according to the position in the image data. Above and other features, aspects and advantages of the present disclosure will become apparent from the following detailed description of the disclosure understood in conjunction with the accompanying drawings.

Embodiments of the disclosure will be described in detail with reference to the drawings. In the drawings, the same or corresponding parts are denoted by the same reference numerals, and description thereof will not be repeated.

§ 1 Example of Application

First, an example of a situation in which the disclosure is applied will be described with reference to FIG. 1. FIG. 1 is a diagram schematically illustrating a situation in which an image processing system 1 according to the embodiment is applied.

The image processing system 1 includes a camera 8 which is an example of an imaging unit, an illumination device 4 which is an example of an illumination unit, and a generation unit 10 which generates image data R that is used for image measurement for a workpiece W which is a target. As one example, the generation unit 10 is provided in the image processing device 100 having a structure according to a general-purpose computer architecture.

The camera 8 is disposed so that at least a part of the workpiece W is included in the field of imaging view. In the illumination device 4, a plurality of light emitting units 41 for irradiating the workpiece W with illumination light are disposed. Each light emitting unit 41 may be configured of one light source or may be configured of a plurality of light sources. In addition, the light sources included in one light emitting unit 41 may be of one type or a plurality of types.

The generation unit 10 acquires a plurality of pieces of image data 81 obtained by imaging while varying light emission states of the plurality of light emitting units 41 included in the illumination device 4 according to illumination states. Here, the variation between the light emission states means that at least one of luminance and wavelength of light radiated from each light emitting unit 41 is different. For example, when at least one of the luminance and the wavelength of the light radiated from one light emitting unit 41 is different, it can be said that the light emission states are different even when the luminance and the wavelength of the light radiated from the light emitting units 41 other than the one light emitting unit 41 are both the same.

In the example of FIG. 1, a light emission state 1 to a light emission state m are defined as illumination conditions. The generation unit 10 acquires image data 81-1 to 81-$m$ captured in respective light emission states 1 to m. It should be noted that the image data 81-1 to the image data 81-$m$ are hereinafter referred to as image data 81 for the sake of convenience of description when it is not necessary to distinguish the image data 81-1 to the image data 81-$m$.

The generation unit 10 generates image data R to be used for image measurement on the basis of a generation condition defined in association with a position in the image data 81 and the plurality of pieces of acquired image data 81-1 to 81-$m$.

"Defined in association with a position in the image data" includes a generation condition defined by pixels in the image data and a generation condition defined in association with a position of the workpiece W captured in the image data.

In the example of FIG. 1, (x, y) is defined as the position of the image data 81, and a condition is set for each position. That is, a condition P defined for each position (x, y) of the image data 81 is set as the generation condition.

For example, in the example of FIG. 1, the generation unit 10 generates the image data R on the basis of the condition P defined for each position (x, y) of the image data 81 from the image data 81-1 to 81-$m$.

Here, the condition P defined for each position (x, y) of the image data 81 includes selection of one or a plurality of pieces of image data 81 from the plurality of pieces of acquired image data 81, and a method of generating an image at a corresponding position from the one or plurality of pieces of selected image data 81.

In the image processing system 1, the generation unit 10 generates the image data R to be used for image measurement on the basis of the plurality of pieces of image data 81 captured in the respective different light emission states according to the illumination conditions and the generation condition defined in association with the position of the image data 81. Therefore, in the image processing system 1, the image measurement can be performed using the image data generated under appropriate conditions for each position of the image data 81. Thus, it is possible to perform the image measurement with high accuracy.

Further, in the image processing system 1, since it is possible to acquire a plurality of pieces of image data 81 captured in the respective different light emission states with respect to one workpiece W, it is possible to obtain a normal vector of a surface of the workpiece W through calculation based on an illuminance difference stereo method.

It should be noted that it is assumed hereinafter that a common generation condition is defined for each of a plurality of pixels included in a partial region $r_i$ including a plurality of adjacent pixels in the image data 81 for convenience of description.

§ 2 Specific Example

Hereinafter, a more detailed configuration and process of the image processing system 1 according to the embodiment will be described as a more specific example of an application of the disclosure.

[A. Basic Configuration of Image Processing System 1]

Figure 2:
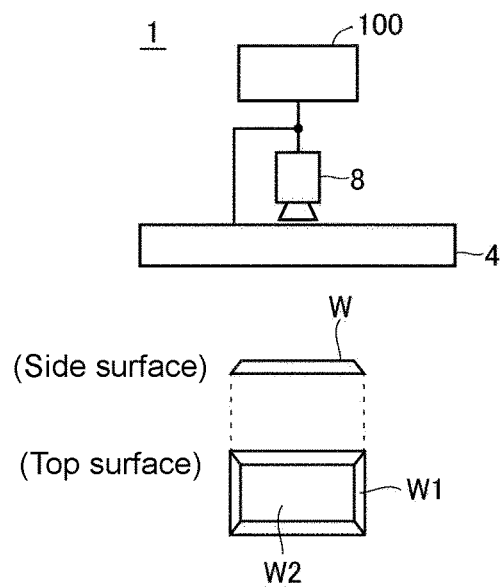
FIG. 2 is a schematic diagram illustrating a basic configuration of the image processing system according to an embodiment of the disclosure.

FIG. 2 is a schematic diagram illustrating a basic configuration of the image processing system 1 according to the embodiment of the disclosure. The image processing system 1 includes the image processing device 100, the camera 8, and the illumination device 4 as main components. The image processing device 100, the camera 8, and the illumination device 4 are connected to each other so that the image processing device 100, the camera 8, and the illumination device 4 can perform data communication.

The illumination device 4 is disposed so that at least a part of an inspection target (hereinafter also referred to as a "workpiece W") is located in an irradiation region of the illumination device 4. It should be noted that, when the workpiece W is conveyed by a conveying device such as a belt conveyor, the illumination device 4 is disposed so that at least a part of the conveying device is located in the irradiation region. In the example of FIG. 2, the workpiece W is an object having a shape of a vertical square stand having a tapered portion W1 and a flat portion W2. It should be noted that the shape of the workpiece W is an example, and the image processing system 1 is used for any workpiece W.

The camera 8 is disposed such that at least a part of the workpiece W is located in a field of imaging view of the camera 8 and at least a part of the irradiation region of the illumination device 4 is included in the field of imaging view of the camera 8. The camera 8 images a subject present in the field of imaging view and outputs an image signal (which may include one or a plurality of still images and moving images) obtained by the imaging to the image processing device 100. The camera 8 is an example of an imaging unit and is a photoelectric converter that converts light included in a predetermined field of imaging view into an image signal. Typically, the camera 8 includes an optical system such as a lens and an aperture, and a light reception element such as a charge coupled device (CCD) image sensor or a complementary metal oxide semiconductor (CMOS) image sensor.

In the example of FIG. 2, the workpiece W, the illumination device 4, and the camera 8 are disposed to be coaxial with each other. An opening 48 (see FIG. 3) is provided in the illumination device 4 so that the camera 8 can image the workpiece W from above the illumination device 4. The camera 8 is disposed so that the workpiece W is included in the field of imaging view through the opening 48. It should be noted that a positional relationship between the workpiece W, the illumination device 4, and the camera 8 is merely an example, and the workpiece W, the illumination device 4, and the camera 8 may not be coaxial with each other. For example, the illumination device 4 may be disposed on the right side of the page and the camera 8 may be disposed on the left side of the page.

The image processing device 100 serves a process of the entire image processing system 1. For example, the image processing device 100 controls the illumination device 4 and the camera 8, and performs image processing such as an inspection of the presence or absence of defects or dirt on the workpiece W, measurement of a size, a disposition, or a direction of the workpiece W, and recognition of a character, a figure, or the like on the surface of the workpiece W on the basis of the image signal output from the camera 8.

Although one device performs the function of controlling the illumination device 4 and the camera 8 and the function of performing the image processing in the example of FIG. 2, it should be noted that the image processing system 1 may include a separate device for each function. For example, the image processing system 1 may include an illumination control device that controls the illumination device 4, an imaging control device that controls the camera 8, and a device that performs the image processing. Further, another device may have one function.

[B. Configuration of Illumination Device 4]

Figure 3:
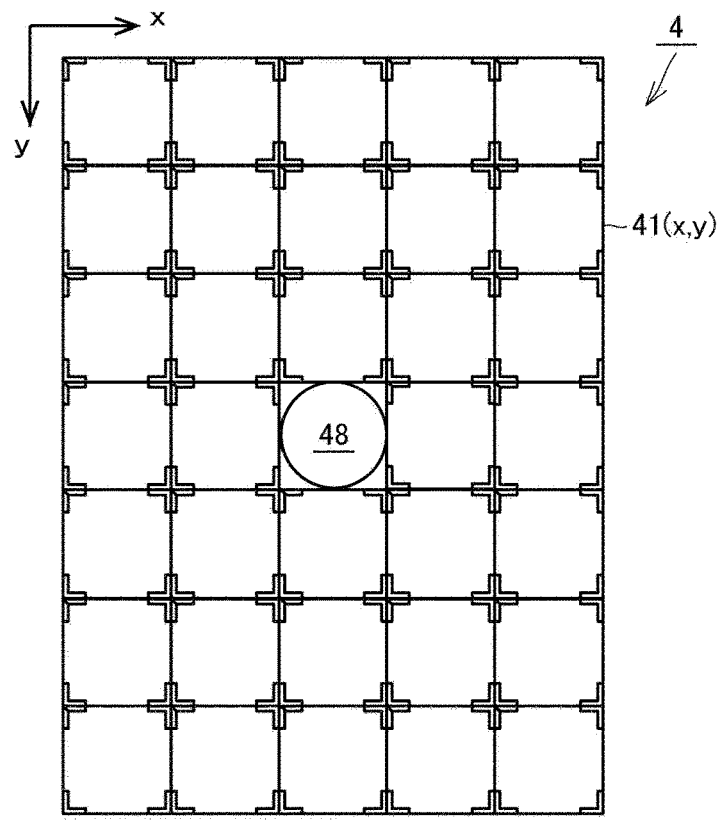
FIG. 3 is a diagram illustrating a configuration of an illumination device.

A configuration of the illumination device 4 will be described with reference to FIG. 3. FIG. 3 is a diagram illustrating the configuration of the illumination device 4. The illumination device 4 includes a plurality of light emitting units 41. In the example of FIG. 3, the illumination device 4 includes a total of 34 light emitting units 41. In a center of the illumination device 4, an opening 48 is provided so that the workpiece W can be imaged from above the illumination device 4.

In the example of FIG. 3, the respective light emitting units 41 are regularly disposed in the illumination device 4 with reference to a predetermined position. For example, in the example of FIG. 3, the light emitting units 41 are regularly disposed vertically and horizontally with respect to one point among sides and points constituting the illumination device 4. It should be noted that the light emitting units 41 may be disposed around the opening 48 in a circular shape with respect to the opening 48.

An interval between the light emitting units 41 is preferably as narrow as possible in order to allow light to be incident on the workpiece W from various angles. In addition, it is preferable for the plurality of respective light emitting units 41 to have the same structure, and it is preferable for the respective light emitting units 41 to be disposed at the same height.

In the embodiment, each of the plurality of light emitting units 41 included in the illumination device 4 is distinguished by the coordinates (x, y), with a short side of the illumination device 4 defined as an x axis and a long side defined as a y axis, for convenience of description.

The image processing device 100 can independently control the plurality of light emitting units 41. For example, the image processing device 100 can turn on only some of the light emitting units 41 and turn off the other light emitting units 41. Further, the image processing device 100 can turn on the plurality of light emitting units 41 with different light emission intensities.

In the embodiment, it is assumed that the workpiece W is irradiated with illumination light having the same wavelength from each light emitting unit 41. It should be noted that the configuration in which the wavelength of the illumination light radiated from the light emitting unit 41 can be controlled to be different among the plurality of respective light emitting units 41 may be adopted.

Further, although the quadrangular illumination device 4 is exemplified in the embodiment, a ring-shaped illumination device may be used. Further, the illumination device 4 may be a transmissive illumination device configured of an organic electro luminescence (EL). When the transmissive illumination device is used, it is not necessary to provide the opening 48 as in the embodiment. Further, the illumination device 4 may be a dome-shaped illumination device. Further, the image processing system 1 preferably includes the illumination device 4 with which the camera 8, the illumination device 4, and the workpiece W can be disposed coaxially, but may also include an illumination device 4 with which the camera 8, the illumination device 4, and the workpiece W cannot be disposed coaxially.

[C. Hardware Configuration of Image Processing Device 100]

Figure 4:
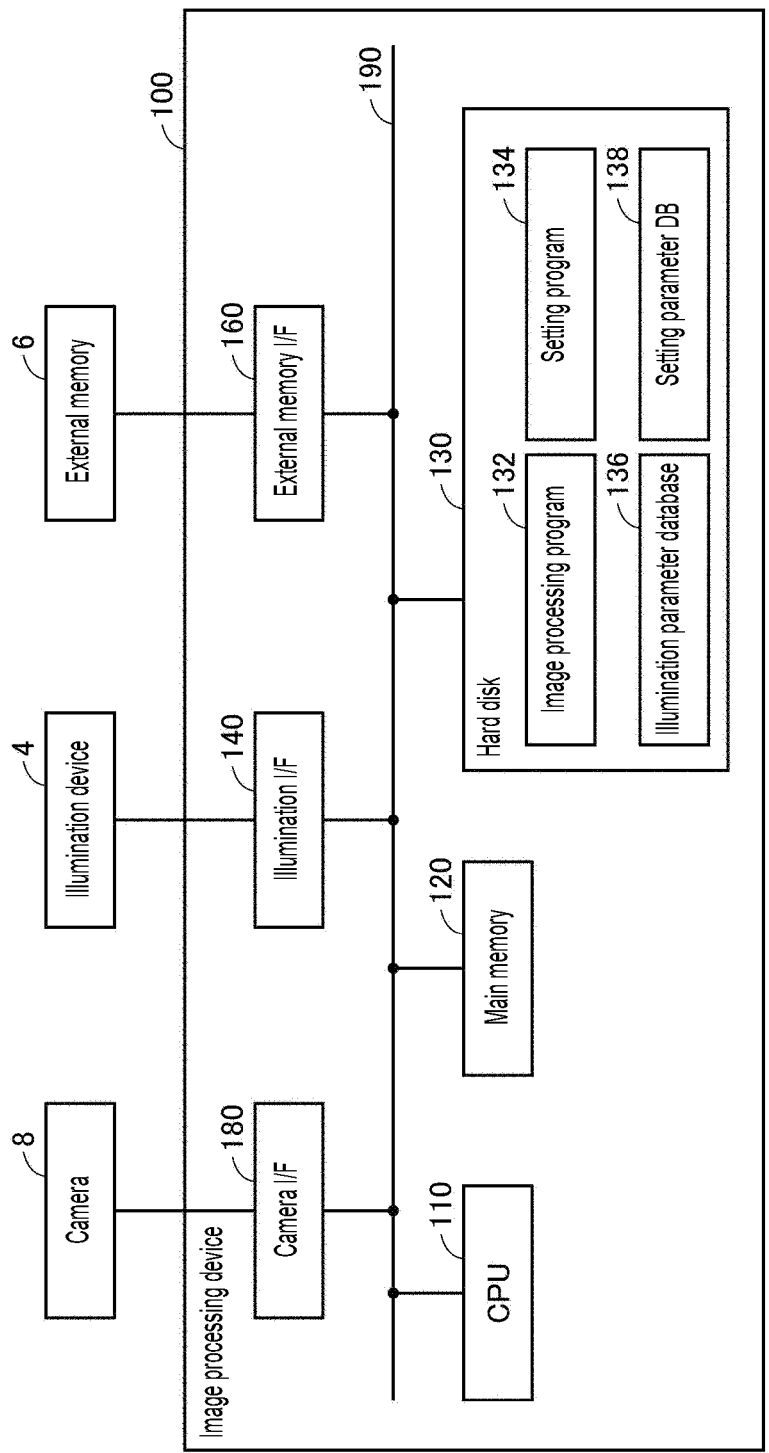
FIG. 4 is a schematic diagram illustrating a hardware configuration of an image processing device.

FIG. 4 is a schematic diagram illustrating a hardware configuration of the image processing device 100. The image processing device 100 includes a central processing unit (CPU) 110, a main memory 120, a hard disk 130, a camera interface (I/F) 180, an illumination I/F 140, and an external memory I/F 160. These units are connected via a bus 190 so that the units can perform data communication with each other.

The CPU 110 develops a program (codes) including an image processing program 132 and a setting program 134 installed in the hard disk 130 in the main memory 120 and executes the programs in a predetermined order to perform various calculations. The main memory 120 is typically a volatile storage device such as a dynamic random access memory (DRAM).

The hard disk 130 is an internal memory included in the image processing device 100 and is a nonvolatile storage device. The image processing program 132, the setting program 134, an illumination parameter database (DB) 136, and a setting parameter DB 138 are included. A semiconductor storage device such as a flash memory may be adopted in addition to the hard disk 130, or in place of the hard disk 130.

The camera I/F 180 mediates data transmission between the CPU 110 and the camera 8. That is, the camera I/F 180 is connected to the camera 8 that generates image data. The camera I/F 180 gives a command for controlling an imaging operation in the connected camera 8 according to an internal command from the CPU 110.

The illumination I/F 140 mediates data transfer between the CPU 110 and the illumination device 4. That is, the illumination I/F 140 is connected to the illumination device 4. Further, the illumination I/F 140 gives a command for controlling turn-on of each of the plurality of light emitting units 41 included in the connected illumination device 4 according to an internal command from the CPU 110. It should be noted that the illumination device 4 may be connected to the image processing device 100 via the camera 8. Further, the camera 8 may be connected to the image processing device 100 via the illumination device 4.

The external memory I/F 160 is connected to an external memory 6, and performs a process of reading/writing data from/to the external memory 6. The external memory 6 is attachable to and detachable from the image processing device 100, and is typically a nonvolatile storage device such as a Universal Serial Bus (USB) memory or a memory card. Various programs such as the image processing program 132 or the setting program 134 and various parameter DBs such as an illumination parameter DB 136 or the setting parameter DB 138 do not have to be stored in the hard disk 130 and may be stored in a server capable of communicating with the image processing device 100 or the external memory 6 that can be directly connected to the image processing device 100. For example, various programs to be executed by the image processing device 100 and various parameters to be used in various programs are distributed in a state in which the various programs and the various parameters have been stored in the external memory 6, and the external memory I/F 160 reads the various programs and the various parameters from the external memory 6. Alternatively, programs or parameters downloaded from a server or the like communicably connected to the image processing device 100 may be installed in the image processing device 100.

It should be noted that the image processing program 132 and the setting program 134 according to the embodiment may be provided by being incorporated in a part of another program.

Alternatively, some or all of functions provided by executing the image processing program 132 and the setting program 134 may be implemented as a dedicated hardware circuit.

[Overview]

When an appearance inspection of the workpiece W is performed through image processing from an appearance image of the workpiece W, the image data according to the inspection can be acquired by changing an intensity of the light to be radiated and a wavelength of the light to be radiated according to, for example, inspection items such as positional relationships between the illumination device 4, the camera 8, and the workpiece W, a material of the workpiece W, and a type of scratch to be detected.

In the related art, when image processing is performed without moving the camera 8 relative to the workpiece W, one illumination condition is set for one imaging. However, the positional relationships between the illumination device 4, the camera 8m and the workpiece W are different in each region of the workpiece W. Therefore, even when a feature quantity suitable for inspection can be extracted from the image data of a certain region in one imaging, there is concern that a feature quantity suitable for the inspection will not be able to be extracted from image data of another region.

For example, in the field of imaging view of the camera 8, a line-of-sight direction of the camera 8 or a radiation direction of light from the illumination device 4 are different according to the position. Further, in some shapes of the workpiece W, the line-of-sight direction of the camera 8 or the radiation direction of light from the illumination device 4 are different according to the position. Therefore, obtaining image data suitable for inspection at any position in the field of imaging view of the camera 8 cannot be realized simultaneously.

The image processing system 1 according to the embodiment can acquire image data suitable for an inspection at any position in the image data by generating image data suitable for the purpose of image measurement for each position in the field of imaging view.

First Specific Example

A first specific example for acquiring image data suitable for inspection at any position in the field of imaging view and performing image measurement will be described. In the image processing system 1 according to the first specific example, the camera 8 generates a plurality of pieces of image data 81 by changing illumination conditions. The image processing device 100 extracts partial image data 82 corresponding to the partial region $r_i$ from each of the plurality of pieces of image data 81 for each partial region $r_i$ defined in the image data 81, and combines the plurality of pieces of partial image data 82 according to a first parameter set $\rho_i$ defined for each partial region $r_i$, thereby generating partial region image data $R_i$. Further, the image processing device 100 performs image measurement on the generated partial region image data $R_i$.

(Flow of Image Measurement)

Figure 5:
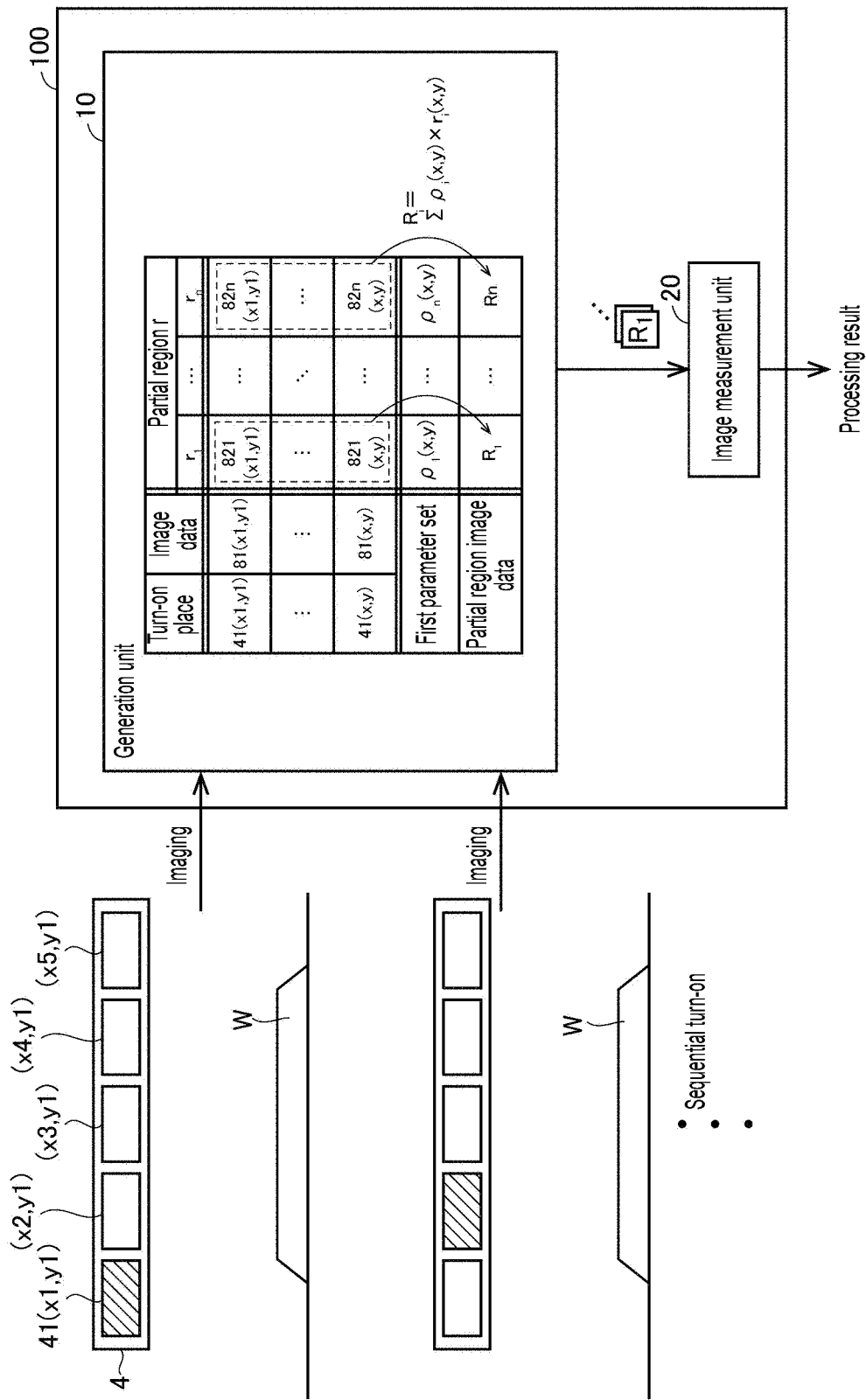
FIG. 5 is a diagram illustrating a flow of image measurement in a first specific example.

A flow of the image measurement that is performed by the image processing system 1 according to a first specific example will be described with reference to FIG. 5. FIG. 5 is a diagram illustrating a flow of the image measurement in the first specific example.

The image processing device 100 causes the plurality of light emitting units 41 to sequentially emit light one by one, images a target in correspondence to the sequential light emission of the light emitting units 41, and acquires the image data 81. For example, the image processing device 100 acquires, for example, image data 81($x$1, $y$1) captured in light emission state 1 in which only the light emitting unit 41($x$1, $y$1) is turned on with a predetermined light emission intensity and image data 81($x$2, $y$1) captured in light emission state 2 in which only the light emitting unit 41($x$2, $y$1) is turned on with a predetermined light emission intensity from the camera 8. It should be noted that the image data 81 obtained by imaging under a turn-on condition in which the light emitting unit 41($x$, $y$) is turned on with a predetermined light emission intensity is hereinafter represented as image data 81($x$, $y$).

The image data 81 includes a plurality of predefined partial regions $r_i$. These partial regions $r_i$ correspond to parts of the field of imaging view of the camera 8. The image processing device 100 extracts partial image data 82$i$($x$, $y$) corresponding to the partial region $r_i$ of a generation target from the plurality of pieces of image data 81($x$, $y$). The image processing device 100 combines a plurality of pieces of partial image data 82$i$($x$, $y$) extracted from the plurality of pieces of image data 81($x$, $y$) according to the first parameter set $\rho_i$ defining an influence from each light emitting unit 41 for each partial region $r_i$ to generate the partial region image data $R_i$ for each partial region $r_i$.

The first parameter set $\rho_i$ defining the influence from each light emitting unit 41 for each partial region $r_i$ relatively indicates whether each piece of partial image data 82$i$($x$, $y$) corresponding to the partial region $r_i$ of the plurality of pieces of image data 81($x$, $y$) obtained by imaging in different light emission states is image data suitable for the purpose of the image measurement. The suitability for the purpose of the image measurement can be determined according to, for example, whether or not a feature quantity to be obtained is included in the partial image data 82$i$($x$, $y$) or whether or not the feature quantity not to be obtained is included in the partial image data 82$i$($x$, $y$).

In spite of a feature quantity suitable for the image measurement being extracted from partial image data 821 ($x$1, $y$1) included in the partial region $r_1$ in the image data 81($x$1, $y$1) generated on the basis of the light radiated from the light emitting unit 41($x$1, $y$1), a feature quantity unsuitable for the image measurement may be extracted from partial image data 821($x$5, $y$1) included in the partial region $r_1$ in the image data 81($x$5, $y$1) generated on the basis of the light radiated from the light emitting unit 41($x$5, $y$1). This is because a positional relationship between a surface region of the workpiece W corresponding to the region $r_i$, the camera 8, and the light emitting unit 41 is different between the light emitting unit 41($x$1, $y$1) and the light emitting unit 41($x$5, $y$1). In this case, the first parameter set $\rho_i$ is set so that an influence of the partial image data 821($x$1, $y$1) from which the feature quantity suitable for the image measurement is extracted is great and an influence of the partial image data 821($xy$, $y$1) from which the feature quantity unsuitable for the image measurement is extracted is small.

For example, the first parameter set $\rho_i$ is a set of first parameters $\rho_i(x, y)$ set for each piece of image data 81($x$, $y$). The image processing device 100 includes the first parameter set $\rho_i$ for each partial region $r_i$. The image processing device 100 calculates, for example, partial region image data $R_i$ on the basis of Equation (1) below.

$$R_i = \Sigma_{x,y} \rho_i(x,y) \times r_i(x,y) \qquad \text{Equation (1)}$$

The image processing device 100 performs the image measurement on the basis of the obtained partial region image data $R_i$. For example, the image processing device 100 extracts a feature quantity included in the obtained partial region image data $R_i$, and measures a surface condition of the workpiece W on the basis of the feature quantity.

Here, when the pieces of partial region image data $R_i$ are combined using the first parameter set $\rho_i$, the combination is performed using a linear sum, but a combination method is not limited thereto. For example, a plurality of linear sums may be obtained and multiplication or division between the linear sums may be performed for the combination. Further, the first parameter set $\rho_i$ may be a positive value or a negative value. In addition, a maximum value or a minimum value may be used for calculation at the time of the combination. In addition, when the image measurement is performed, the partial region image data $R_i$ may be individually evaluated, and all the pieces of partial region image data $R_i$ may be combined to generate image data of the entire field of imaging view of the camera 8 and the image measurement may be performed.

(Correction of First Parameter Set $\rho_i$)

The image processing device 100 may correct the first parameter set $\rho_i$ according to a disposition situation of the workpiece W in the field of imaging view. For example, when the disposition situation of the workpiece W in the field of imaging view at the time of setting the first parameter set $\rho_i$ is different from the disposition situation in the field of imaging view of the workpiece W at the time of the measurement, accuracy of the image measurement becomes lower than original accuracy when the first parameter set $\rho_i$ is used without being corrected in spite of a positional relationship between the light emitting unit 41 and the workpiece W being different from that at the time of setting the first parameter set $\rho_i$.

Figure 6A:
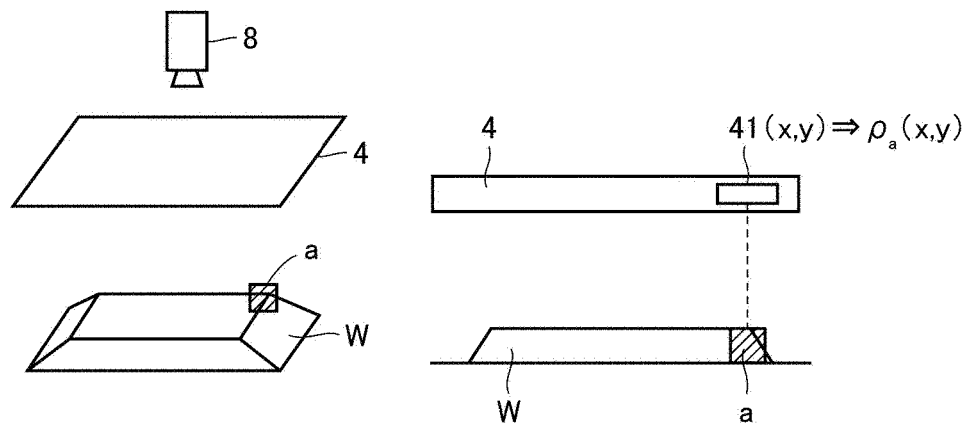
FIG. 6(A) to FIG. 6(C) are diagrams illustrating position correction of a first parameter set in the first specific example.
Figure 6B:
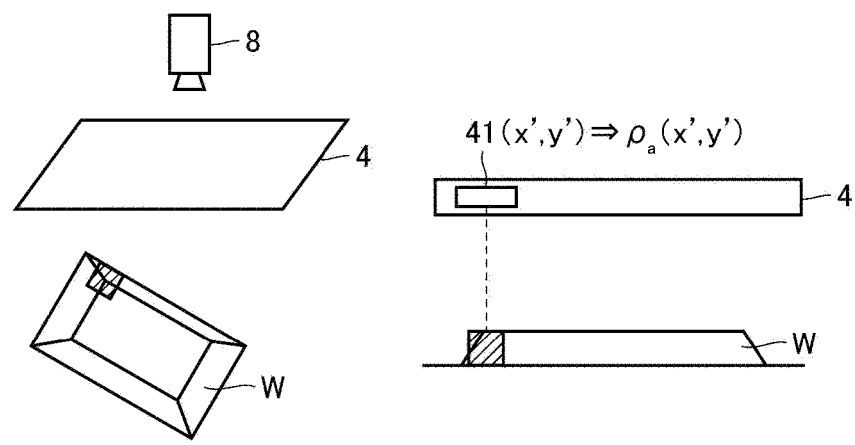
Figure 6C:
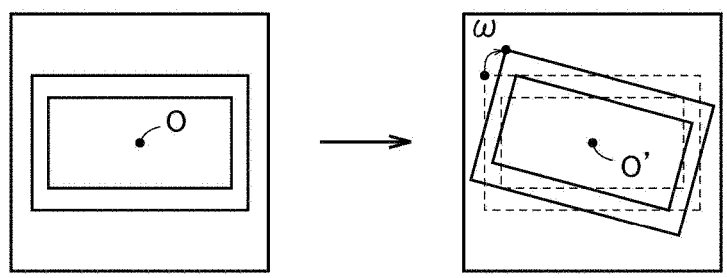

FIG. 6(A) to FIG. 6(C) are diagrams illustrating position correction of the first parameter set $\rho_i$ in the first specific example. For example, it is assumed that, when the first parameter set $\rho_i$ is set, a first parameter $\rho_a(x, y)$ has been set for a position in the image data 81($x$, $y$) corresponding to a region a of the image data 81($x$, $y$) captured by the light emitting unit 41($x$, $y$) located above the region a of the workpiece W, as illustrated in FIG. 6(A). In this case, it is assumed that a disposition situation of the workpiece W is changed at the time of measurement and a light emitting unit 41($x'$, $y'$) is located above the region a of the workpiece W, as illustrated in FIG. 6(B). A first parameter $\rho_a(x', y')$ for a position in the image data 81($x'$, $y'$) corresponding to the region a of the image data 81($x'$, $y'$) imaged by the light emitting unit 41 (X $y'$) is corrected with the first parameter $\rho_a(x, y)$ at the time of the measurement, such that the first parameter $\rho_a$ according to the positional relationship between the workpiece W and the light emitting unit 41 can be set.

Here, a relationship between (x, y) and (x', y') is represented by, for example, Equation (2).

$$(x', y') = \omega \times (x, y) + T \quad \text{Equation (2)}$$

As illustrated in FIG. 6(C), co is a rotation component indicating a degree of rotation of the workpiece W at the time of setting at the time of measurement, and is indicated by a rotation vector, for example. Further, T is a translational component indicating how much a center of the workpiece W has translated in parallel. It should be noted that the first parameter set $\rho_i$ may be corrected using another known method.

(Functional Configuration of Image Processing Device Used for Image Measurement in First Specific Example)

Figure 7:
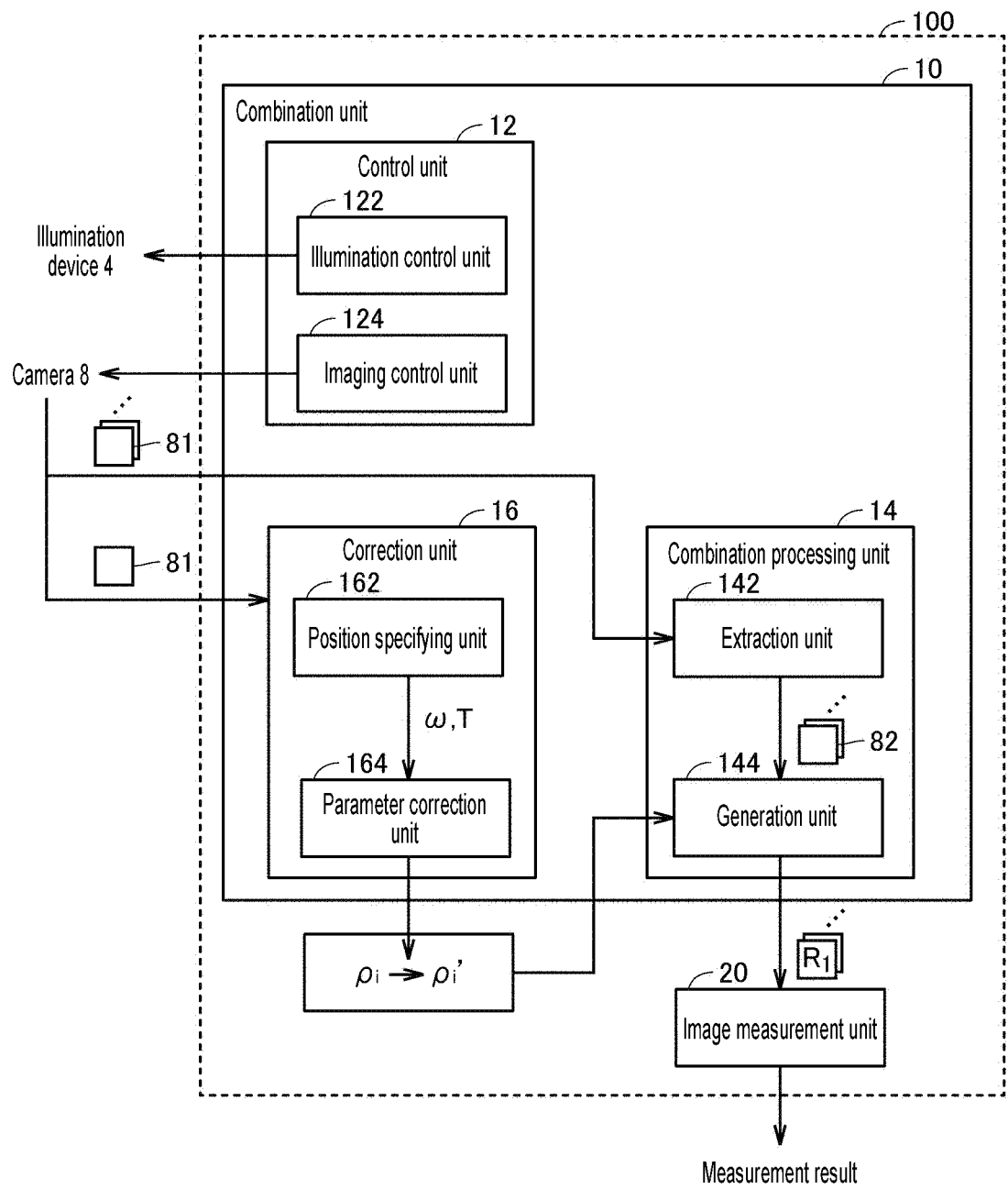
FIG. 7 is a diagram illustrating a functional configuration of an image processing device used for image measurement in the first specific example.

FIG. 7 is a diagram illustrating a functional configuration of the image processing device 100 that is used for image measurement in the first specific example. The image processing device 100 includes a generation unit 10 and an image measurement unit 20. The generation unit 10 acquires a plurality of pieces of image data 81 obtained by imaging under a plurality of illumination conditions in which the light emission states of the plurality of light emitting units 41 included in the illumination device 4 are made different from each other, and generates partial region image data $R_i$ from the plurality of pieces of image data 81.

The generation unit 10 includes a control unit 12 that controls the illumination device 4 and the camera 8, and a combination processing unit 14 that combines the partial region image data $R_i$ from the plurality of pieces of image data 81(x, y) captured and generated by the camera 8 according to the control from the control unit 12.

The control unit 12 includes, for example, an illumination control unit 122 that controls the illumination device 4 so that the light emitting units 41 sequentially emit light one by one, and an imaging control unit 124 that controls the camera 8 so that the workpiece W is imaged in correspondence to the sequential light emission of the light emitting units 41.

For example, the combination processing unit 14 includes an extraction unit 142 that extracts the partial image data 82i(x, y) corresponding to the partial region $r_i$ that is a combination target from the plurality of pieces of image data 81(x, y) generated by the camera 8, and a combination unit 144 that combines the plurality of pieces of extracted partial image data 82i(x, y) according to the first parameter set $\rho_i$ corresponding to the partial region $r_i$ to generate the partial region image data $R_i$.

Further, the generation unit 10 may include a correction unit 16 that corrects the condition regarding the generation of the partial region image data $R_i$ according to the disposition situation of the workpiece W. In the first specific example, the correction unit 16 corrects the first parameter set $\rho_i$ according to the disposition situation of the workpiece W. The correction unit 16 includes a position specifying unit 162 that specifies the disposition situation of the workpiece W, and a parameter correction unit 164 that corrects the condition regarding the generation of the partial region image data $R_i$ on the basis of a degree of movement of the workpiece W from the disposition situation that is a reference on the basis of the disposition situation of the workpiece W specified by the position specifying unit 162. In the first specific example, the parameter correction unit 164 corrects the first parameter set $\rho_i$. The first parameter set $\rho_i$ is stored in, for example, the illumination parameter DB 136.

The disposition situation of the workpiece W that is a reference is, for example, the disposition situation of the workpiece W at the time of setting the first parameter set $\rho_i$. The disposition situation of the workpiece W at the time of setting is, for example, a situation in which a centroid position of the workpiece W, the camera 8, and the illumination device 4 are disposed coaxially.

In the first specific example, the combination processing unit 14 may generate the partial region image data $R_i$ according to the parameter set $\rho'_i$ corrected by the parameter correction unit 164.

Further, the generation unit 10 may specify a region including the workpiece W and generate only the partial region image data $R_i$ corresponding to the partial region $r_i$ that is in the region including the workpiece W. Thus, it is possible to reduce the number of times the partial region image data $R_i$ is generated, and to reduce a process that is executed by the generation unit 10.

The image measurement unit 20 performs the image measurement on the partial region image data $R_i$ and outputs an image measurement result. The image measurement unit 20 for example may extract a feature quantity for each partial region image data $R_i$ and measure an appearance of the workpiece W on the basis of the feature quantity. Further, the image measurement unit 20 may combine all of the plurality of generated partial region image data $R_i$, extract the feature quantity, and then measure the appearance of the workpiece W on the basis of the feature quantity. Examples of an output destination of the image measurement result may include a control device that performs predetermined control on the basis of the image measurement result, a mobile terminal, a printer, a display unit such as a display, and a storage unit such as a memory.

(Method of Determining First Parameter Set $\rho_i$)

Figure 8:
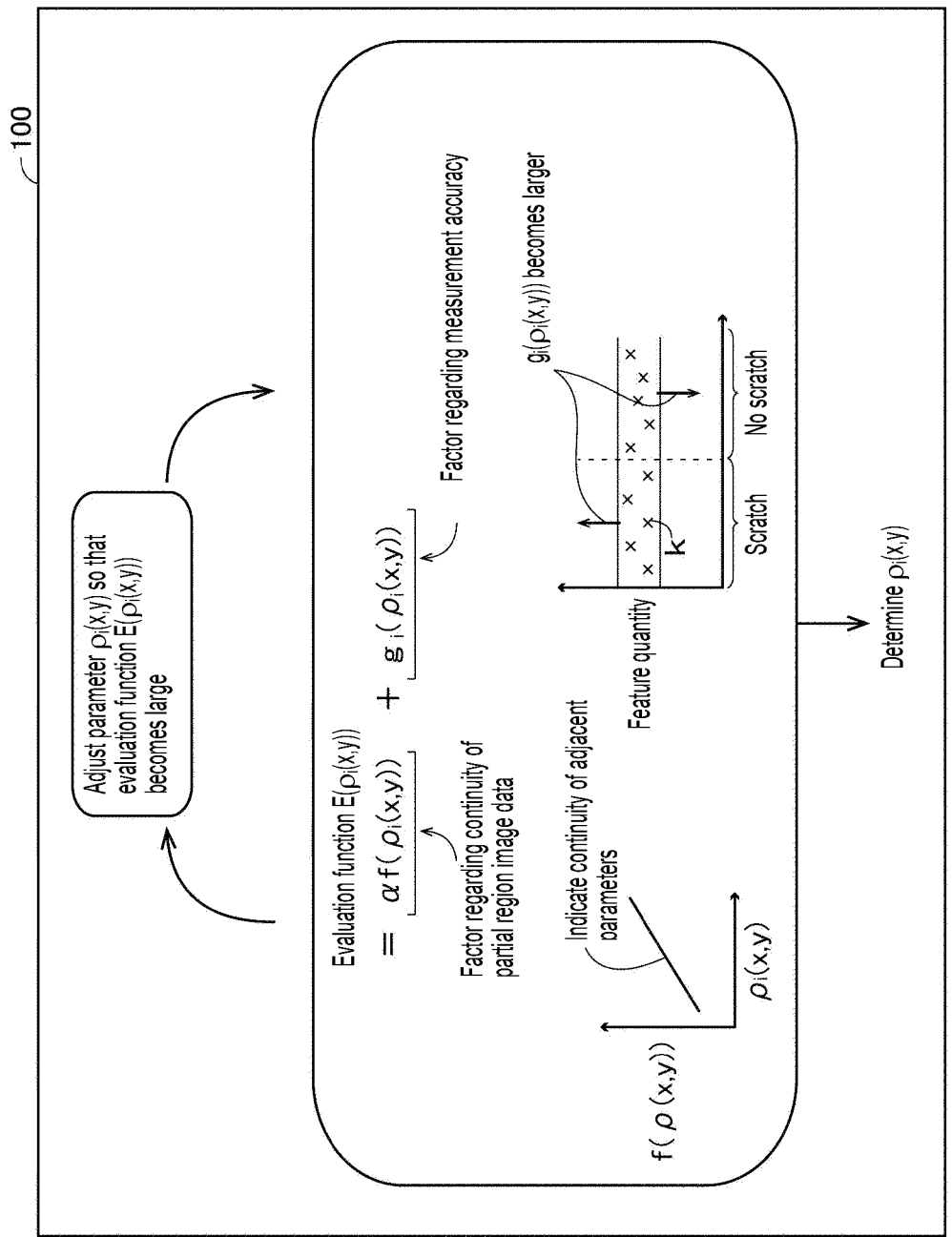
FIG. 8 is a diagram illustrating a method of determining the first parameter set in the first specific example.
Figure 8:
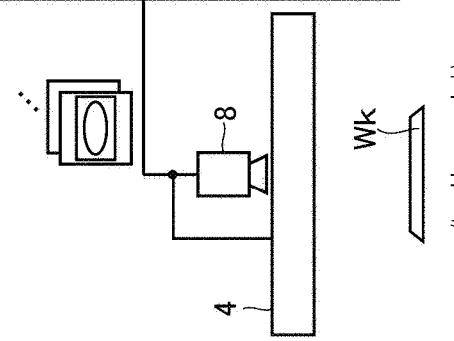

FIG. 8 is a diagram illustrating a method of determining the first parameter set $\rho_i$ in the first specific example. The first parameter set $\rho_i$ is determined such that the image data R generated according to the first parameter set $\rho_i$ becomes image data suitable for the purpose of the image measurement.

The "image data suitable for the purpose of the image measurement" is, for example, image data in which a predetermined feature quantity is included in a region with scratches, and the feature quantity is not included in a region without the scratches when the purpose of the image measurement is an inspection for checking the presence or absence of the scratches.

As a determination method, for example, the first parameter set $\rho_i$ is fitted so that a state of an appearance of a teaching sample indicated by image data R generated from image data obtained by imaging a teaching sample Wk of which a state of an appearance is known is matched with a state of an appearance of an actual teaching sample Wk. It should be noted that the first parameter set $\rho_i$ may be determined, for example, to have a value by which the feature quantity is separated from a predetermined threshold value when the image measurement result is divided into two results according to whether or not the feature quantity exceeds the predetermined threshold value, without using the teaching sample Wk. That is, when the image measurement has been performed on a plurality of samples, the first parameter set $\rho_i$ may be determined so that a feature quantity extracted from a sample included in a set that is a first result and a feature quantity extracted from a sample included in a set that is a second result have separated values.

It should be noted that a method of imaging a teaching sample Wk of which a state of an appearance is known, and determining the first parameter set $\rho_i$ so that a state of an actual appearance of the teaching sample Wk is matched with a state of the appearance of the teaching sample indicated by the image data R will be described below by way of example.

The image processing device 100 causes the plurality of light emitting units 41 to sequentially emit light one by one and determines the first parameter set $\rho_i$ on the basis of a plurality of pieces of image data 81 obtained by imaging the teaching sample Wk of which a state of an appearance is known in correspondence to the sequential light emission of the light emitting unit 41. The image processing device 100, for example, determines the first parameter set $\rho_i$ by fitting the first parameter set $\rho_i$ so that a value indicated by a predetermined cost function $E(\rho_i)$ is maximized.

The cost function $E(\rho_i)$ includes a function $f(\rho_i)$ indicating continuity between the partial region image data $R_i$ and an adjacent partial region image data $R_{i+1}$ and $R_{i-1}$ and a function $g(\rho_i)$ indicating measurement accuracy when the partial region image data $R_i$ has been subjected to image measurement. In the cost function $E(\rho_i)$, which of a factor regarding the continuity of the partial region image data $R_i$ and a factor regarding the measurement accuracy is important in determining the first parameter set $\rho_i$ can be indicated by multiplying each function by a constant α and a constant β.

A function regarding the measurement accuracy will be described in detail. For example, a case in which it is determined that there are scratches on the appearance when an extracted feature quantity exceeds a predetermined threshold value, and it is determined that there is no scratches when the feature quantity is smaller than the threshold value is considered. In this case, the function regarding the measurement accuracy is a function $g(\rho_i)$ by which a value is indicated increase as the feature quantity included in the partial region image data $R_i$ corresponding to the partial region $r_i$ with scratches is larger or as the feature quantity included in the partial region image data $R_i$ corresponding to the partial region $r_i$ without scratches is smaller.

The function $g(\rho_i)$ regarding the measurement accuracy is expressed, for example, by Equation (3).

$$g(\rho_i) = \Sigma_{ik}[S_{ik} \times \text{Var}(\Sigma_{x,y} \rho_i(x,y) \times r_i(x,y))] \quad \text{Equation (3)}$$

$S_{ik}$ is teaching data and is a value indicating whether or not there are scratches on a surface corresponding to the partial region $r_i$ in the teaching sample Wk. $S_{ik}$ is "S=1" when there are the scratches on the surface corresponding to the partial region $r_i$ in the teaching sample Wk and is "S=−1" when there is no scratch. In addition, Var is a density variance of an image or a value obtained by binarizing the density variance, and is a density variance of pixel values in the partial region image data $R_i$ or a value obtained by binarizing the density variance. It should be noted that Var may be a feature quantity included in the partial region image data $R_i$.

By causing the function $f(\rho_i)$ indicating the continuity to be included in the cost function $E(\rho_i)$, it is possible to prevent the first parameter set $\rho_i$ from being locally optimized.

Although the function $f(\rho_i)$ indicating the continuity is included in the cost function $E(\rho_i)$ in the example illustrated in FIG. 8, the function $f(\rho_i)$ indicating the continuity may not be included. In addition, when the first parameter set $\rho_i$ is adjusted, various known methods such as a method based on a gradient method or a method using a neural network can be adopted.

(Functional Configuration of Image Processing Device at Time of Determining the First Parameter Set $\rho_i$ in First Specific Example)

Figure 9:
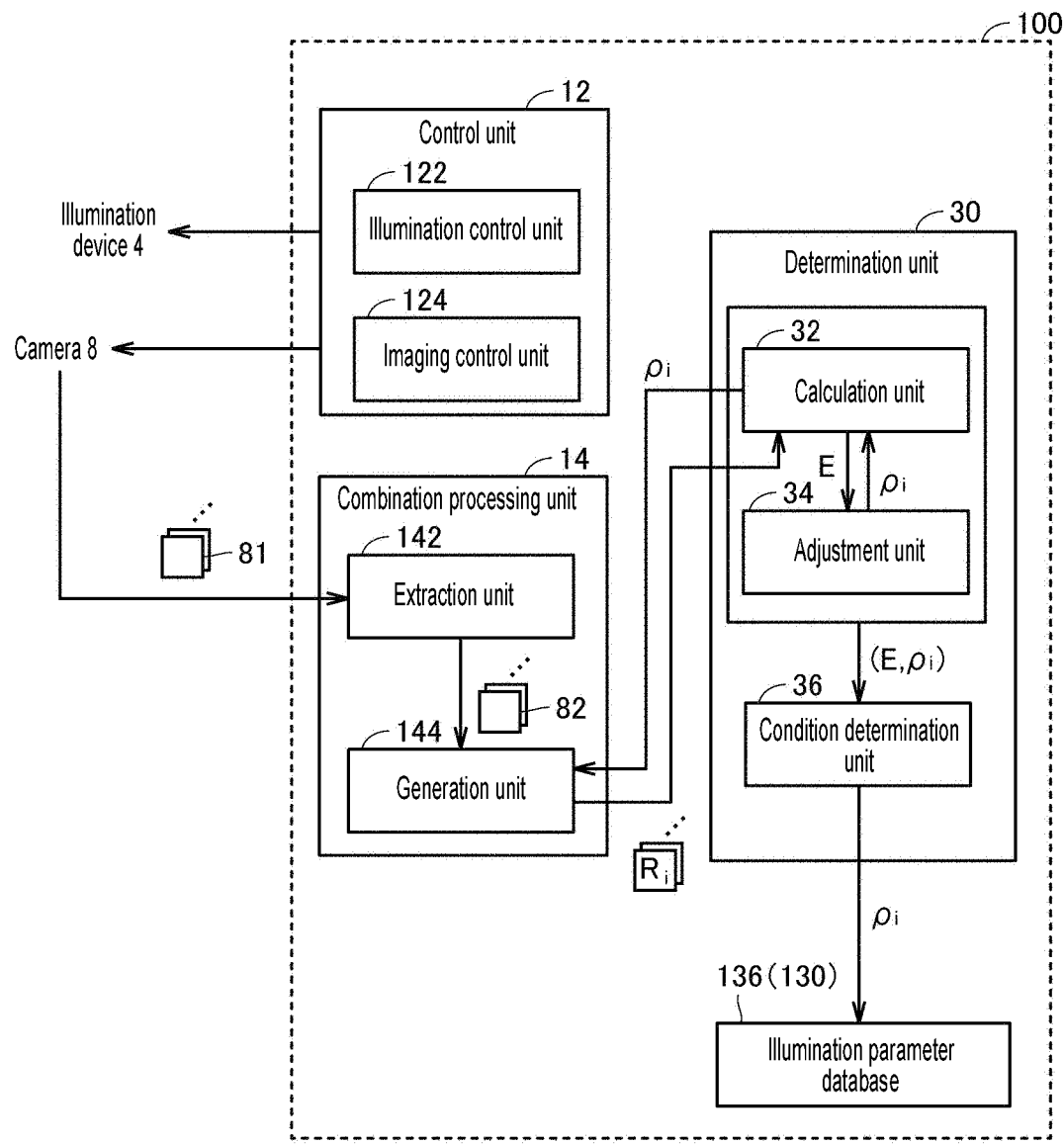
FIG. 9 is a diagram illustrating a functional configuration of the image processing device at the time of determining the first parameter set in the first specific example.

FIG. 9 is a diagram illustrating a functional configuration of the image processing device 100 at the time of determining the first parameter set $\rho_i$ in the first specific example. The image processing device 100 includes a control unit 12 that controls the illumination device 4 and the camera 8, a combination processing unit 14 that combines the partial region image data $R_i$ from the plurality of pieces of image data 81(x, y) captured and generated by the camera 8 according to the control from the control unit 12, and a determination unit 30.

The control unit 12 includes, for example, an illumination control unit 122 that controls the illumination device 4 so that the light emitting units 41 sequentially emit light one by one, and an imaging control unit 124 that controls the camera 8 so that the workpiece W is imaged in correspondence to the sequential light emission of the light emitting units 41.

The determination unit 30 includes a calculation unit 32 that calculates a cost E according to the cost function $E(\rho_i)$, an adjustment unit 34 that fits the condition so that the value of the cost E increases, and a condition determination unit 36 that determines the condition. The condition includes the first parameter set $\rho_i$, and the first parameter set $\rho_i$ is, in other words, a combination parameter set defined for each position of the image data 81. In the first specific example, the adjustment unit 34 fits the first parameter $\rho_i$, and the condition determination unit 36 determines the first parameter set $\rho_i$ for each partial region $r_i$.

For example, the combination processing unit 14 includes an extraction unit 142 that extracts the partial image data 82i(x, y) corresponding to the partial region $r_i$ that is a combination target from the plurality of pieces of image data 81(x, y) generated by the camera 8, and a combination unit 144 that combines the plurality of pieces of extracted partial image data 82i(x, y) according to the first parameter set $\rho_i$ corresponding to the partial region $r_i$ to generate the partial region image data $R_i$.

The calculation unit 32 causes the combination unit 144 to generate the partial region image data $R_i$ from the plurality of pieces of partial image data 82 extracted by the extraction unit 142 according to the first parameter set $\rho_i$ adjusted by the adjustment unit 34, and calculates the cost E from the partial region image data $R_i$ generated by the combination unit 144 and the partial image data 82 extracted by the extraction unit 142.

The adjustment unit 34 adjusts the first parameter set $\rho_i$ on the basis of the cost E calculated by the calculation unit 32. The condition determination unit 36 evaluates the cost E calculated by the calculation unit 32 to determine the first parameter set $\rho_i$, and stores the first determined parameter set $\rho_i$ as the illumination parameter DB 136 in the hard disk 130 that is an example of the storage unit.

Although the first parameter set $\rho_i$ is provided for each partial region $r_i$ in the first specific example, the first parameter set $\rho_i$ may be provided for each pixel. Further, the first parameter set $\rho_i$ may be defined in association with the position of the image data 81. For example, the first parameter set $\rho_i$ may be a continuous function related to the position.

Second Specific Example

A second specific example for acquiring image data suitable for inspection at any position in the field of imaging view and performing the image measurement will be described. In the first specific example, the partial image data 82 has been extracted from the plurality of pieces of image data 81 with the different illumination conditions, and the plurality of pieces of extracted partial image data 82 are combined according to the first parameter set $\rho_i$, thereby generating the partial region image data $R_i$.

In the second specific example, the image processing device 100 changes the light emission state for each partial region $r_i$ according to a second parameter set $P_i$ indicating the light emission state set for each partial region $r_i$, images the workpiece W, and generates the partial region image data $R_i$ corresponding to the partial region $r_i$ from the obtained image data 81.

(Flow of Image Measurement)

Figure 10:
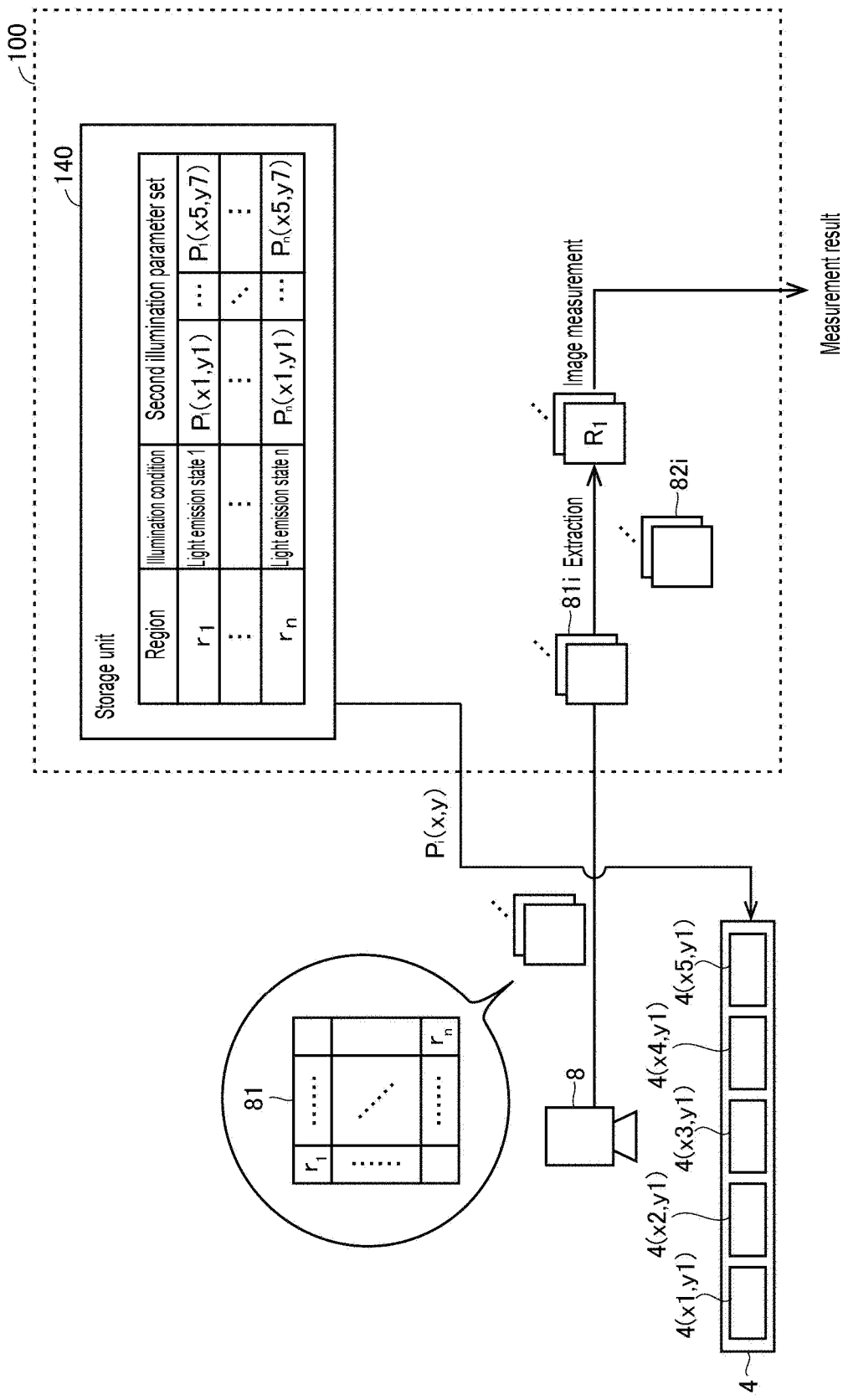
FIG. 10 is a diagram illustrating a flow of image measurement in a second specific example.

A flow of image measurement that is performed by the image processing system 1 according to the second specific example will be described with reference to FIG. 10. FIG. 10 is a diagram illustrating a flow of image measurement in the second specific example.

The image processing device 100 controls the illumination device 4 according to the second parameter set $P_i$ defining the light emission state of the plurality of light emitting units 41. Specifically, the second parameter set $P_i$ is a parameter indicating a light emission intensity of each light emitting unit 41(x, y), and the second parameter set $P_i$ includes a second parameter $P_i(x, y)$ indicating the light emission intensity of the light emitting unit 41(x, y) provided for each light emitting unit 41(x, y).

The second parameter set $P_i$ is provided for each partial region $r_i$ that defined in the image data 81. The image processing device 100 controls the illumination device 4 according to each of the second parameter sets $P_i$ provided for each partial region $r_i$ and changes the light emission state according to each of the second parameters $P_i$. The camera 8 images a target in each light emission state and generates image data 81i. The image processing device 100 extracts the partial image data 82i corresponding to the partial region $r_i$ as the partial region image data $R_i$ from the image data 81i generated under each illumination condition. The image processing device 100 performs image measurement on the generated partial region mage data $R_i$ and outputs an image measurement result.

For example, when the partial region image data $R_i$ corresponding to the partial region $r_i$ is generated, the image processing device 100 causes light to be emitted with the light emission intensity of each light emitting unit 41(x, y) of the illumination device 4 set as light emission intensity corresponding to the second parameter set $P_i$. From the image data 81i generated by imaging under this illumination condition, the image processing device 100 extracts partial image data corresponding to the partial region $r_i$ as the partial region image data $R_i$.

(Correction of Second Parameter Set $P_i$)

The image processing device 100 may correct the second parameter set $P_i$ according to a disposition situation of the workpiece W in the field of imaging view. For example, when the disposition situation of the workpiece W in the field of imaging view at the time of setting the second parameter set $P_i$ is different from the disposition situation in the field of imaging view of the workpiece W at the time of the measurement, accuracy of the image measurement becomes lower than original accuracy when the second parameter set $P_i$ is used without being corrected in spite of a positional relationship between the light emitting unit 41 and the workpiece W being different from that at the time of setting the second parameter set $P_i$.

Figure 11:
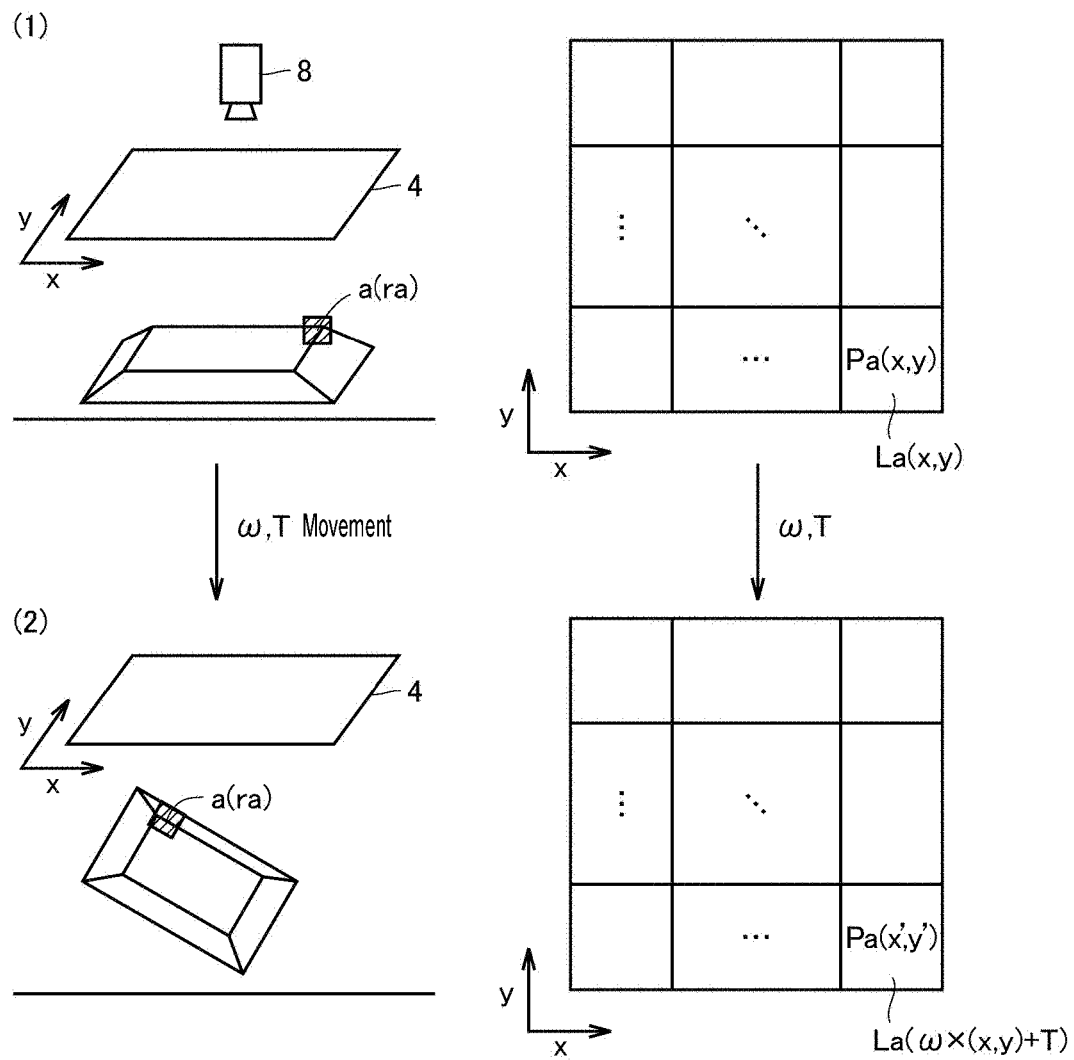
FIG. 11 is a diagram illustrating position correction of a second parameter set in the second specific example.

FIG. 11 is a diagram illustrating the position correction of the second parameter set $P_i$ in the second specific example. For example, it is assumed that, at the time of setting the second parameter set $P_i$, a second parameter Pa(x, y) is set as the illumination condition when the partial region image Ra of the partial region ra corresponding to the region a of the workpiece W is generated, such that the light emitting unit 41(x1, y1) is turned on according to a second parameter $P_a$(x1, y1), the light emitting unit 41(x2, y1) is turned on according to a second parameter $P_a$(x2, y1), . . . , as illustrated in (1) of FIG. 11.

In this case, it is assumed that the disposition situation of the workpiece W has changed at the time of measurement, and the position of the partial region ra corresponding to the region a of the workpiece W has moved by T in a parallel direction and by ω in a rotation direction as compared with the time of setting. That is, a positional relationship between the workpiece W and the illumination device has changed by T in the parallel direction and by co in the rotating direction.

The image processing device 100 resets a relationship between the second parameter $P_a$(x, y) and the light emitting unit 41(x, y) according to a change in the positional relationship, thereby correcting the second parameter set $P_i$.

For example, it is assumed that light emission of the light emitting unit 41(x, y) with the second parameter $P_a$(x, y) is set at the time of setting. In this case, it is assumed that the second parameter $P_a$(x, y) is expressed by a light emission intensity $L_a$ and the light emitting unit 41(x, y). $P_a$ (x', y') after the correction is expressed by Equation (4).

$$P_a(x',y'')=L_a\{\omega \times (x,y)+T\}$$ Equation (4)

Here, since coefficients indicated by ω and T are equal to the coefficients indicated by ω and T in Equation (2), description thereof will be omitted.

(Functional Configuration of Image Processing Device 100 Used for Image Measurement in Second Specific Example)

Figure 12:
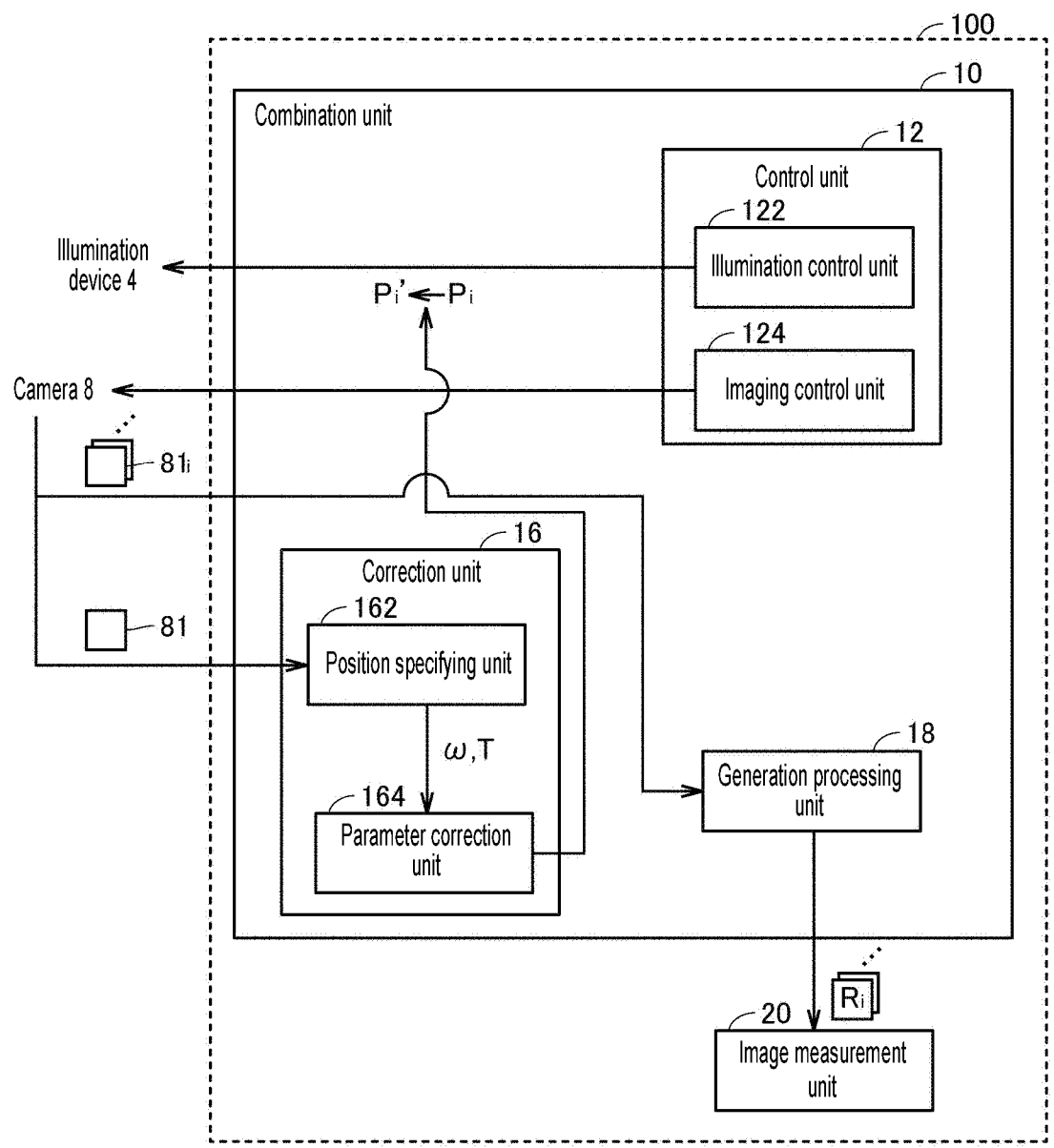
FIG. 12 is a diagram illustrating a functional configuration of an image processing device used for image measurement in the second specific example.

FIG. 12 is a diagram illustrating a functional configuration of the image processing device 100 that is used for image measurement in the second specific example. The image processing device 100 includes a generation unit 10 and an image measurement unit 20.

The generation unit 10 may include a control unit 12 that controls the illumination device 4 and the camera 8, and a generation processing unit 18 that generates partial region image data $R_i$ corresponding to a partial region $r_i$ of a generation target from at least one piece of image data 81 among a plurality of pieces of image data 81 captured and generated by the camera 8 according to the control from the control unit 12.

The control unit 12 includes an illumination control unit 122 that controls the illumination device 4 and an imaging control unit 124 that controls the camera 8. The illumination control unit 122 controls the light emission intensity of each of the plurality of light emitting units 41(x, y) according to the second parameter set $P_i$ set for each partial region $r_i$. When the illumination device 4 is controlled according to the second parameter set $P_i$, the imaging control unit 124 causes the camera 8 to image the workpiece W so that the image data 81i is generated.

The generation processing unit 18 generates image data corresponding to the partial region $r_i$ corresponding to the second parameter set $P_i$ which corresponds to the illumination condition under which the image data 81i has been captured, as the partial region image data $R_i$.

Further, the generation unit 10 may include a correction unit 16 that corrects the condition regarding the generation of the partial region image data $R_i$ according to the disposition situation of the workpiece W. In the second specific example, the correction unit 16 corrects the second parameter set $P_i$ according to the disposition situation of the workpiece W. The correction unit 16 includes a position specifying unit 162 that specifies the disposition situation of the workpiece W, and a parameter correction unit 164 that corrects the condition regarding the generation of the partial region image data $R_i$ on the basis of a degree of movement of the workpiece W from the disposition situation that is a reference on the basis of the disposition situation of the workpiece W specified by the position specifying unit 162. In the second specific example, the parameter correction unit 164 corrects the second parameter set $\rho_i$. The second parameter set $\rho_i$ is stored in, for example, the illumination parameter DB 136.

The disposition situation of the workpiece W that is a reference is, for example, the disposition situation of the workpiece W at the time of setting the second parameter set $P_i$. The disposition situation of the workpiece W at the time of setting is, for example, a situation in which the centroid position of the workpiece W, the camera 8, and the illumination device 4 are disposed coaxially.

The illumination control unit 122 may control the light emission state of the illumination device 4 according to a second parameter set $P'_i$ corrected by the parameter correction unit 164.

Further, the generation unit 10 may specify a region including the workpiece W and perform imaging only under the illumination condition corresponding to the partial region image data $R_i$ corresponding to the partial region $r_i$ that is in the region including the workpiece W. Thus, it is possible to reduce the number of times of imaging, and to reduce a process that is executed by the generation unit 10.

(Method of Determining Second Parameter Set $P_i$)

Figure 13:
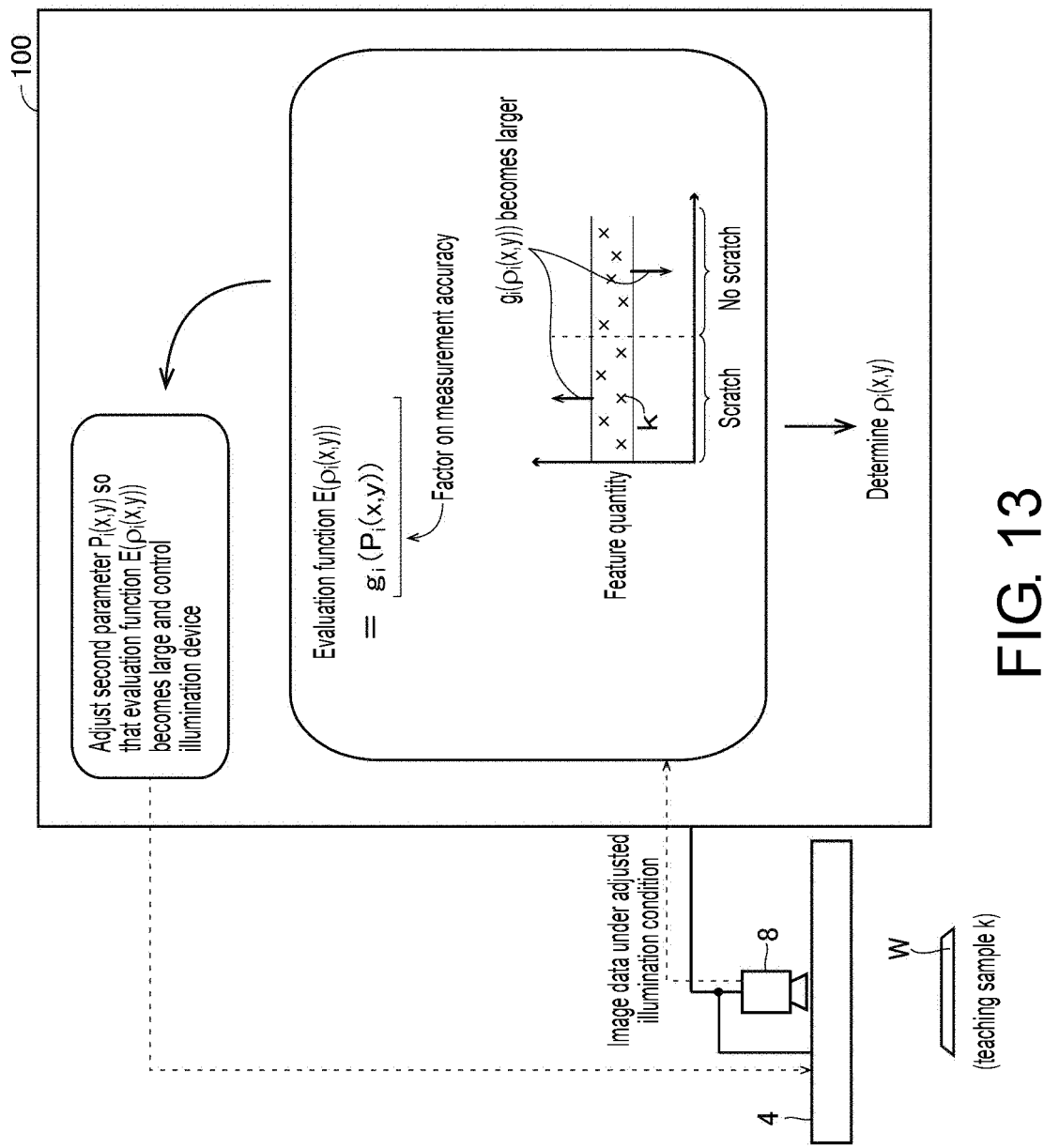
FIG. 13 is a diagram illustrating a method of determining the second parameter set in the second specific example.

FIG. 13 is a diagram illustrating a method of determining the second parameter set $P_i$ in the second specific example. The second parameter set $P_i$ is determined such that the image data R generated from the image data 81 obtained by controlling the illumination device 4 according to the second parameter set $P_i$ and performing imaging under each light emission state becomes image data suitable for the purpose of image measurement.

The "image data suitable for the purpose of the image measurement" is, for example, image data in which a predetermined feature quantity is included in a region with scratches, and the feature quantity is not included in a region without the scratches when the purpose of the image measurement is an inspection for checking the presence or absence of the scratches.

As a determination method, the second parameter set $P_i$ is fitted so that a state of an appearance indicated by image data R generated on the basis of image data 81 obtained by imaging a teaching sample Wk of which a state of an appearance is known is matched with a state of an actual appearance of the teaching sample Wk, as in the first specific example. The first parameter set $P_i$ may be determined, for example, to have a value by which the feature quantity is separated from a predetermined threshold value when the image measurement result is divided into two results according to whether or not the feature quantity exceeds the predetermined threshold value, without using the teaching sample Wk.

It should be noted that a method of determining the second parameter set $P_i$ so that the state of the appearance indicated by the image data R generated on the basis of the image data 81 obtained by imaging a teaching sample Wk is matched with a state of an actual appearance of the teaching sample Wk will be described below by way of example.

The image processing device 100 determines the second parameter set $P_i$ on the basis of image data 81 obtained by imaging the teaching sample Wk of which a state of an appearance is known in a state in which the light emitting unit 41 is caused to be turned on according to the second appropriate parameter set $P_i$. The image processing device 100 determines the second parameter set $P_i$ by changing the illumination condition and fitting the second parameter set $P_i$ so that a value indicated by a cost function $E(P_i)$ is maximized.

In the second specific example, the cost function $E(P_i)$ includes a function $g(P_i)$ indicating the measurement accuracy when the partial region image data $R_i$ is subjected to the image measurement. The function $g(P_i)$ indicating the measurement accuracy is a function in which a value indicated by a function regarding a degree of matching increase as the feature quantity included in the partial region image data $R_i$ corresponding to the partial region $r_i$ with scratches is larger or as the feature quantity included in the partial region image data $R_i$ corresponding to the partial region $r_i$ without scratches is smaller, as in the function $g(\rho_i)$ in the first specific example.

The function $g(P_i)$ regarding the measurement accuracy is expressed, for example, by Equation (5).

$$g(P_i) = \Sigma_{ik}[S_{ik} \times \text{Var}(\Sigma_{x,y} P_i(x,y) \times r_i(x,y))] \qquad \text{Equation (5)}$$

$S_{ik}$ is teaching data and is a value indicating whether or not there are scratches on a surface corresponding to the partial region $r_i$ in the teaching sample Wk. $S_{ik}$ is "S=1" when there are the scratches on the surface corresponding to the partial region $r_i$ in the teaching sample Wk and is "S=−1" when there is no scratch. In addition, Var is a density variance of an image or a value obtained by binarizing the density variance, and is a density variance of pixel values in the partial region image data $R_i$ or a value obtained by binarizing the density variance. It should be noted that Var may be a feature quantity included in the partial region image data $R_i$.

Here, when the second parameter set $P_i$ is determined, the second parameter set $P_i$ is determined so that the cost $E_i$ obtained from the partial region image data $R_i$ is maximized for the partial region image data $R_i$.

It should be noted that when the second parameter set $P_i$ is calculated, the second parameter set $P_i$ may be obtained by changing the light emission intensity of each of the plurality of light emitting units 41 in a round-robin manner or may be obtained by adjusting the second parameter set $P_i$ using a hill climbing method.

(Functional Configuration of the Image Processing Device at Time of Determining Second Parameter Set $P_i$ in Second Specific Example)

Figure 14:
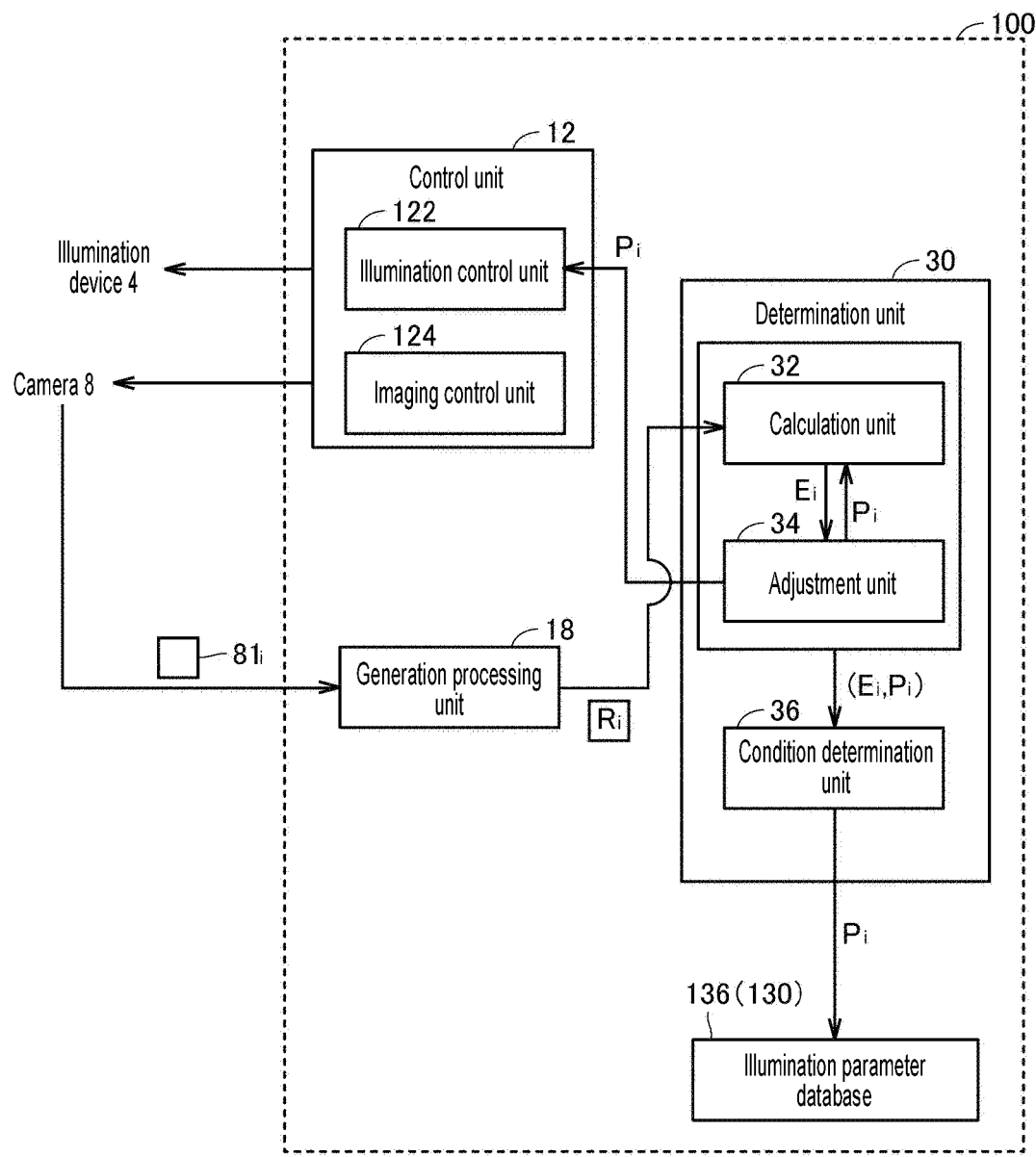
FIG. 14 is a diagram illustrating a functional configuration of an image processing device at the time of determining the second parameter in the second specific example.

FIG. 14 is a diagram illustrating a functional configuration of the image processing device 100 at the time of determining the second parameter set $P_i$ in the second specific example. The image processing device 100 includes a control unit 12 that controls the illumination device 4 and the camera 8, a generation processing unit 18 that generates partial region image data $R_i$ corresponding to the partial region $r_i$ of a generation target from at least one piece of image data 81 among the plurality of pieces of image data 81$(x, y)$ captured and generated by the camera 8 according to the control from the control unit 12, and a determination unit 30.

The control unit 12 in the second specific example includes, for example, an illumination control unit 122 that controls the illumination device 4 according to the second designated parameter set $P_i$, and an imaging control unit 124 that controls the camera 8 so that the workpiece W is imaged under an illumination condition controlled according to the second designated parameter set $P_i$.

The illumination control unit 122 in the second specific example controls the illumination device 4 according to the second parameter $P_i$ set for each partial region $r_i$. The image data 81 obtained by the camera 8 performing imaging under the illumination condition in which the illumination device 4 is controlled according to the second parameter $P_i$ is also referred to as image data 81i.

The determination unit 30 includes a calculation unit 32 that calculates a cost E according to the cost function $E(P_i)$, an adjustment unit 34 that fits the condition so that the value of the cost E increases, and a condition determination unit 36 that determines the condition. In the second specific example, the condition includes the second parameter set $P_i$. In the second specific example, the adjustment unit 34 fits the second parameter $P_i$, and the condition determination unit 36 determines the second parameter set $P_i$ for each partial region $r_i$.

The generation processing unit 18 extracts, for example, the partial image data 82i corresponding to the partial region $r_i$ from the plurality of pieces of image data 81i generated by the camera 8 and generates the partial region image data $R_i$.

The calculation unit 32 calculates the cost E from the partial region image data $R_i$ that the generation processing unit 18 generates from the image data 81 captured under the illumination condition controlled according to the second parameter set $P_i$ adjusted by the adjustment unit 34.

The adjustment unit 34 adjusts the second parameter set $P_i$ on the basis of the cost E calculated by the calculation unit 32. Specifically, the adjustment unit 34 resets the second parameter set $P_i$ so that the cost E is increased, images the teaching sample Wk again under the illumination condition according to the reset second parameter set $P_i$, and acquires the image data 81. On the basis of the acquired image data 81, the condition determination unit 36 evaluates the cost E calculated by the calculation unit 32 to determine the second parameter set $P_i$, and stores the determined second parameter set $P_i$ as the illumination parameter DB 136 in the hard disk 130 which is an example of the storage unit.

Although the second parameter set $P_i$ is provided for each partial region $r_i$ in the second specific example, the second parameter set $P_i$ may be provided for each pixel. Further, the second parameter set $P_i$ may be defined in association with the position of the image data 81 and may be, for example, a continuous function related to the position.

Example of Application

Although the partial region image data $R_i$ is generated from at least one piece of image data 81 among the plurality of pieces of image data 81 captured under different illumination conditions in the embodiment, a normal vector of the surface of the workpiece W included in the partial region $r_i$ may be obtained according to a calculation using an illuminance difference stereo method.

Since the plurality of pieces of image data 81 with different illumination conditions can be obtained without changing the positional relationship between the position of the camera 8 and the workpiece W, the normal vector of the surface of the workpiece W can be obtained by processing the image data 81 using a calculation method according to the illuminance difference stereo method. That is, the image processing system 1 in the embodiment can acquire a larger amount of information on the workpiece W, as compared with the image processing system 1 in which the illumination condition is fixed.

Further, in both of the image measurement in the first specific example and the image measurement in the second specific example, the workpiece W is imaged under different illumination conditions to thereby acquire the plurality of pieces of image data 81, and then the partial region image data $R_i$ is generated for each partial region $r_i$ on the basis of at least one piece of the image data 81 among the plurality of image data 81. Therefore, it is possible to set an appropriate illumination condition in the entire field of imaging view (the entire image data 81).

Modification Example (Partial region $r_i$)

Figure 15:
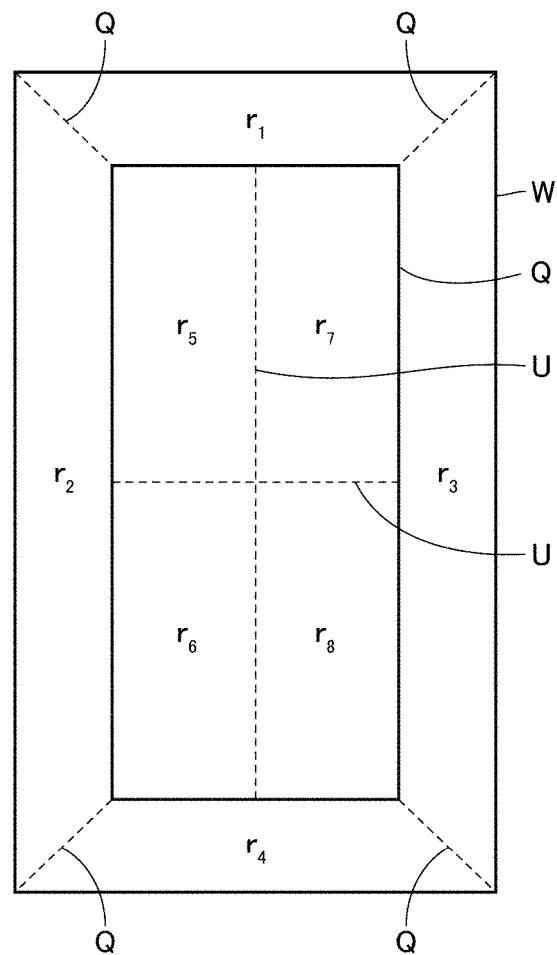
FIG. 15 is a diagram illustrating a modification example of a method of defining a partial region $r_i$.

In the embodiment, it has been assumed that the partial region $r_i$ is defined in the image data 81 at regular intervals. FIG. 15 is a diagram illustrating a modification example of the method of defining the partial region $r_i$. For example, the partial region $r_i$ may be defined pixel by pixel. Further, the partial region $r_i$ may be defined on the basis of the workpiece W, as in the example of FIG. 15. For example, the partial region r; may be defined using a model image (CAD data) of the workpiece W. Specifically, a normal vector of the surface of the workpiece W may be obtained and a region having a common normal direction may be divided as one region. In FIG. 15, regions $r_1$, $r_2$, $r_3$, $r_4$, and $r_5$ are regions having different normal directions, and regions $r_5$ to $r_8$ are regions having a common normal direction. Further, the region may be further divided according to an area of one region having the common normal direction. When the region is divided, it is preferable for a boundary Q at which the normal direction rapidly changes to be set as a boundary of the partial region $r_i$. In addition, it is preferable for a region having an area equal to or greater than a certain area to be divided into a plurality of regions. For example, in the example illustrated in FIG. 15, $r_5$ to $r_8$ have the common normal direction, but when a total area of $r_5$ to $r_8$ is equal to or greater than a specific area, the region is divided according to the boundary U.

Further, in the first specific example, after the light emitting units 41 are turned on one by one, the pieces of image data 81 may be acquired, a density vector may be extracted for each corresponding region in each piece of image data 81, and then, a range in which a correlation between the extracted density vectors is high may be set as one partial region $r_i$.

(Method of Setting Parameters)

When the first parameter set $\rho_i$ or the second parameter set $P_i$ is set, fitting may be performed with the smaller number of partial regions $r_i$, and then, the fitting may be performed again with the larger number of partial regions $r_i$. Thus, it is possible to shorten a fitting time.

When the teaching samples Wk are used, the number of teaching samples Wk may be any number. The number of the teaching samples Wk may be reduced by performing imaging with an attitude of the teaching sample Wk changed. Further, it is preferable for the teaching sample Wk to be such that a good surface and a bad surface can be combined for each region having a different normal direction. That is, when a parameter is set for a workpiece W having two surfaces having no common direction, it is preferable for the parameter to be set using a sample of which a first surface is a bad surface and a second surface is a good surface and a sample of which a second surface is a bad surface and a first surface is a good surface.

Although the cost function $E(\rho_i)$ includes the function $g(\rho_i)$ regarding the measurement accuracy and the function $f(\rho_i)$ regarding the continuity in the first specific example, the cost function $E(\rho_i)$ may include only the function $g(\rho_i)$ regarding the measurement accuracy. Further, although the cost function $E(P_i)$ includes the function $g(P_i)$ regarding the measurement accuracy in the second specific example, the cost function $E(P_i)$ may include the function $f(\rho_i)$ regarding the continuity, in addition to the function $g(P_i)$.

Further, although the continuity between the pieces of partial region image data $R_i$ and the measurement accuracy are evaluated at the same time when the first parameter set $\rho_i$ is set in the first specific example, correction may be performed so that the continuity with the adjacent partial region image data $R_i$ becomes high by setting the first parameter set $\rho_i$ so that the measurement accuracy becomes highest for each partial region $r_i$ and then gradually changing the first parameter set $\rho_i$ in the partial region $r_i$.

Further, a condition for combining the respective pieces of partial region image data $R_i$ may be set, in addition to the first parameter set $\rho_i$ and the second parameter set $P_i$. In the embodiment, there is concern that a gap may be generated at a boundary with the partial region image data $R_i$ and the measurement accuracy may be degraded due to this gap. In order to fill this gap, a condition for combining the respective pieces of partial region image data $R_i$ may be set.

Further, the first parameter set $\rho_i$ or the second parameter set $P_i$ may be set for each partial region and then, the first parameter $\rho_i$ or the second parameter set $P_i$ may be set again so that the gap between the partial areas $r_i$ is reduced for each pixel located between the partial areas $r_i$.

(Combination Method)

Although the example in which inter-image calculation is performed through a linear sum and the combination is performed has been described in the embodiment, the inter-image calculation may be performed according to illuminance difference stereo method. Further, when the image measurement is performed, a spatial filtering process may be performed after the inter-image calculation.

(Number of Times of Imaging)

Although the imaging is performed according to the number of the light emitting units 41 in the first specific example, imaging when the light emitting unit 41 corresponding to the image data 81 is turned on may not be performed when the image data 81 that does not contribute to the generation of the partial region image data $R_i$ from the positional relationship between the workpiece W and the light emitting unit 41 is present among the pieces of image data 81 obtained from the plurality of light emitting units 41. Specifically, when all the first light emission parameters $\rho_i$ corresponding to the light emitting unit 41($x$, $y$) have a value of 0, the image data of the light emitting unit 41($x$, $y$) may not be generated.

Further, a base vector may be obtained as an example of a common element from all illumination parameters and the illumination parameter may be approximated through a linear sum of the base vectors. Accordingly, since the imaging may be performed according to the number of base vectors, the number of times of imaging can be reduced. Specifically, when three partial regions $r_i$ are defined, there are four light emitting units 41, and (1, 2, −1, 0), (2, 4, 1, 3), and (1, 2, 1, 2) are set as the illumination parameter, the base vectors are (1, 2, 0, 1) and (0, 0, 1, 1). By performing the imaging with the parameter corresponding to the base vector, that is, performing the imaging twice, and performing addition or subtraction on the obtained image data with a predetermined coefficient, image data captured under a (1, 2, −1, 0) condition, image data captured under a (2, 4, 1, 3) condition, and image data captured under a (1, 2, 1, 2) condition are approximately obtained.

APPENDIX

As described above, the embodiment includes the following disclosure.

(Configuration 1)

An image processing system (1) that performs image measurement, the image processing system including:

an imaging unit (8) that images a target and generates image data, an illumination unit (4) in which a plurality of light emitting units (41) for irradiating the target with illumination light are disposed, and a generation unit (10) that acquires a plurality of pieces of image data (81) generated by the imaging unit imaging the target in a plurality of different light emission states of the plurality of light emitting units, and generates image data (R) to be used for the image measurement on the basis of the plurality of pieces of acquired image data and a generation condition (P) defined in association with a position in the image data.

(Configuration 2)

The image processing system according to configuration 1, wherein the generation condition (P) is defined for each partial region ($r_i$) including a plurality of adjacent pixels in the image data, the generation unit (10) generates partial region image data ($R_i$) corresponding to the partial region for each partial region as image data (R) to be used for the image measurement.

(Configuration 3)

The image processing system according to configuration 2, wherein the generation unit (10) generates the image data (R) to be used for the image measurement by combining a plurality of partial region image data ($R_i$) generated for each partial region ($r_i$) into one piece of image data.

(Configuration 4)

The image processing system according to configuration 2 or 3, wherein the generation unit (10) includes a control unit (12) that controls (122) the illumination unit so that one of the plurality of light emitting units (41) sequentially emits light, and controls (124) the imaging unit so that the target is imaged in correspondence to the sequential light emission of the light emitting units, and a combination processing unit (14) that extracts (142) partial image data (82$i$) corresponding to the partial region ($r_i$) of a generation target from the plurality of pieces of image data (81) generated by the imaging unit, and combines the plurality of pieces of extracted partial image data (82$i$) according to a first parameter set ($\rho_i$) in which an influence of each light emitting unit has been defined for each partial region to generate the partial region image data ($R_i$).

(Configuration 5)

The image processing system according to configuration 4, wherein the generation unit (10) further includes a position specifying unit (162) that specifies a disposition situation of the target from the image data (81), and a parameter correction unit (164) that compares the disposition situation of the target specified by the position specifying unit with a disposition situation of a reference target at the time of acquisition of the first parameter set to obtain the amount of movement (ω, T) of the target, and corrects the first parameter set on the basis of the amount of movement.

(Configuration 6)

The image processing system according to configuration 2 or 3, wherein the generation unit (10) includes a control unit (12) that controls the illumination unit (4) according to a second parameter set ($P_i$) that defines the plurality of light emission states, and controls the imaging unit (8) so that the imaging unit (8) images the target (W) in each light emission state, and a generation processing unit (18) that extracts partial image data (82$i$) corresponding to the partial region of a generation target from at least one piece of image data (81$i$) among the plurality of pieces of image data (81) generated by the imaging unit (8) and generates the partial region image data ($R_i$) on the basis of the extracted partial image data (82$i$).

(Configuration 7)

The image processing system according to configuration 6, wherein the generation unit (10) further includes a position specifying unit (162) that specifies a disposition situation of the target from the image data (81), and a parameter correction unit (164) that compares the disposition situation of the target specified by the position specifying unit with a disposition situation of a reference target at the time of acquisition of the second parameter set to obtain the amount of movement (ω, T) of the target, and corrects the second parameter set on the basis of the amount of movement.

(Configuration 8)

The image processing system according to configuration 4 or 5, wherein the parameter included in the first parameter set ($ρ_i$) includes a negative value.

(Configuration 9)

The image processing system according to any one of configurations 2 to 8, wherein the partial region ($r_i$) is defined on the basis of a shape of the target (Q, U).

(Configuration 10)

The image processing system according to any of configurations 1 to 9, wherein the plurality of light emitting units (41) are regularly provided in the illumination unit (41) with reference to a predetermined position.

(Configuration 11)

An image processing program (132) for performing image measurement that is executed by a computer (100) that controls an imaging device (8) that images a target and outputs image data (81) and an illumination unit (4) in which a plurality of light emitting units (41) for irradiating the target with illumination light are disposed, the image processing program causing the computer to execute:

a function (12) of acquiring a plurality of pieces of image data generated by the imaging device imaging the target in a plurality of different light emission states of the plurality of light emitting units, and a function (10) of generating image data (R) to be used for the image measurement on the basis of the plurality of pieces of acquired image data (81) and a generation condition (P) defined in association with a position in the image data.

(Configuration 12)

An image processing method for performing image measurement, the image processing method including:

making a plurality of light emission states of a plurality of light emitting units different, acquiring (12) a plurality of pieces of image data (81) by imaging a target in the plurality of different light emission states, and generating image data (R) to be used for the image measurement on the basis of the plurality of pieces of acquired image data (81) and a generation condition (P) defined in association with a position in the image data.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image processing system that performs image measurement, the image processing system comprising:

a camera that images a target and generates image data, wherein an image corresponding to the image data includes a plurality of partial regions which correspond to parts of a field of imaging view of the camera;

a light source in which a plurality of light emitting units for irradiating the target with illumination light are disposed; and a processor configured to execute a generation unit that acquires a plurality of pieces of image data generated by the camera imaging the target in a plurality of different light emission states of the plurality of light emitting units, and generates image data to be used for the image measurement on the basis of the plurality of pieces of acquired image data and a generation condition defined in association with each of the plurality of partial regions which include a plurality of adjacent pixels in the image data, and the generation unit generates partial region image data corresponding to the partial region for each partial region as image data to be used for the image measurement, wherein the generation unit includes:

a control unit that controls the light source so that one of the plurality of light emitting units sequentially emits light, and controls the camera so that the target is imaged in correspondence to the sequential light emission of the light emitting units;

a combination processing unit that extracts partial image data corresponding to the partial region of a generation target from the plurality of pieces of image data generated by the camera, and combines the plurality of pieces of extracted partial image data according to a first parameter set in which an influence of each light emitting unit has been defined for each partial region to generate the partial region image data;

a position specifying unit that specifies a disposition situation of the target from the image data, and a parameter correction unit that compares the disposition situation of the target specified by the position specifying unit with a disposition situation of a reference target at the time of acquisition of the first parameter set to obtain an amount of movement of the target, and corrects the first parameter set on the basis of the amount of movement.

2. The image processing system according to claim 1, wherein the generation unit generates the image data to be used for the image measurement by combining a plurality of pieces of partial region image data generated for each partial region into one piece of image data.

3. The image processing system according to claim 2, wherein the partial region is defined on the basis of a shape of the target.

4. The image processing system according to claim 1, wherein a parameter included in the first parameter set includes a negative value.

5. The image processing system according to claim 1, wherein the partial region is defined on the basis of a shape of the target.

6. The image processing system according to claim 1, wherein the plurality of light emitting units are regularly provided in the light source with reference to an opening provided in the light source.

7. An image processing system that performs image measurement, the image processing system comprising:
   a camera that images a target and generates image data, wherein an image corresponding to the image data includes a plurality of partial regions which correspond to parts of a field of imaging view of the camera;
   a light source in which a plurality of light emitting units for irradiating the target with illumination light are disposed, and
   a processor configured to execute a generation unit that acquires a plurality of pieces of image data generated by the camera imaging the target in a plurality of different light emission states of the plurality of light emitting units, and generates image data to be used for the image measurement on the basis of the plurality of pieces of acquired image data and a generation condition defined in association with each of the plurality of partial regions which include a plurality of adjacent pixels in the image data, and
   the generation unit generates partial region image data corresponding to the partial region for each partial region as image data to be used for the image measurement,
   wherein the generation unit includes:
   a control unit that controls the light source according to a second parameter set that defines the plurality of light emission states, and controls the camera so that the camera images the target in each light emission state;
   a generation processing unit that extracts partial image data corresponding to the partial region of a generation target from at least one piece of image data among the plurality of pieces of image data generated by the camera and generates the partial region image data on the basis of the extracted partial image data;
   a position specifying unit that specifies a disposition situation of the target from the image data, and
   a parameter correction unit that compares the disposition situation of the target specified by the position specifying unit with a disposition situation of a reference target at the time of acquisition of the second parameter set to obtain amount of movement of the target, and corrects the second parameter set on the basis of the amount of movement.

8. A non-transitory computer readable recording medium storing an image processing program for performing image measurement that is executed by a computer that controls an imaging device that images a target and outputs image data and a light source in which a plurality of light emitting units for irradiating the target with illumination light are disposed, wherein an image corresponding to the image data includes a plurality of partial regions which correspond to parts of a field of imaging view of the imaging device, the image processing program enabling the computer to execute:
   a function of acquiring a plurality of pieces of image data generated by the imaging device imaging the target in a plurality of different light emission states of the plurality of light emitting units,
   a function of generating image data to be used for the image measurement on the basis of the plurality of pieces of acquired image data and a generation condition defined in association with each of the plurality of partial regions which include a plurality of adjacent pixels in the image data,
   a function of generating partial region image data corresponding to the partial region for each partial region as image data to be used for the image measurement,
   a function of controlling the light source so that one of the plurality of light emitting units sequentially emits light, and controlling the imaging device so that the target is imaged in correspondence to the sequential light emission of the light emitting units,
   a function of extracting partial image data corresponding to the partial region of a generation target from the plurality of pieces of image data generated by the imaging device, and combining the plurality of pieces of extracted partial image data according to a first parameter set in which an influence of each light emitting unit has been defined for each partial region to generate the partial region image data,
   a function of specifying a disposition situation of the target from the image data, and
   a function of comparing the disposition situation of the target specified by the function of specifying with a disposition situation of a reference target at the time of acquisition of the first parameter set to obtain an amount of movement of the target, and correcting the first parameter set on the basis of the amount of movement.

9. An image processing method for performing image measurement, the image processing method comprising:
   varying a plurality of light emission states of a plurality of light emitting units,
   acquiring a plurality of pieces of image data by imaging a target in the plurality of different light emission states, and
   generating image data to be used for the image measurement on the basis of the plurality of pieces of acquired image data and a generation condition defined in association with each of the plurality of partial regions which include a plurality of adjacent pixels in the image data, wherein an image corresponding to the image data includes a plurality of partial regions which correspond to parts of a field of imaging view of the imaging,
   generating partial region image data corresponding to the partial region for each partial region as image data to be used for the image measurement,
   controlling the plurality of light emitting units so that one of the plurality of light emitting units sequentially emits light, and imaging the target in correspondence to the sequential light emission of the light emitting units,
   extracting partial image data corresponding to the partial region of a generation target from the plurality of pieces of image data, and combining the plurality of pieces of extracted partial image data according to a first parameter set in which an influence of each light emitting unit has been defined for each partial region to generate the partial region image data,
   specifying a disposition situation of the target from the image data, and comparing the disposition situation of the target specified by the specifying with a disposition situation of a reference target at the time of acquisition of the first parameter set to obtain an amount of movement of the target, and correcting the first parameter set on the basis of the amount of movement.

10. A non-transitory computer readable recording medium storing an image processing program for performing image measurement that is executed by a computer that controls an imaging device that images a target and outputs image data and a light source in which a plurality of light emitting units for irradiating the target with illumination light are disposed, wherein an image corresponding to the image data includes a plurality of partial regions which correspond to parts of a field of imaging view of the imaging device, the image processing program enabling the computer to execute:

a function of acquiring a plurality of pieces of image data generated by the imaging device imaging the target in a plurality of different light emission states of the plurality of light emitting units, a function of generating image data to be used for the image measurement on the basis of the plurality of pieces of acquired image data and a generation condition defined in association with each of the plurality of partial regions which include a plurality of adjacent pixels in the image data, a function of generating partial region image data corresponding to the partial region for each partial region as image data to be used for the image measurement, a function of controlling the light source according to a second parameter set that defines the plurality of light emission states, and controlling the imaging device so that the imaging device images the target in each light emission state, a function of extracting partial image data corresponding to the partial region of a generation target from at least one piece of image data among the plurality of pieces of image data generated by the imaging device and generating the partial region image data on the basis of the extracted partial image data, a function of specifying a disposition situation of the target from the image data, and a function of comparing the disposition situation of the target specified by the function of specifying with a disposition situation of a reference target at the time of acquisition of the second parameter set to obtain amount of movement of the target, and correcting the second parameter set on the basis of the amount of movement.

11. An image processing method for performing image measurement, the image processing method comprising:

varying a plurality of light emission states of a plurality of light emitting units, acquiring a plurality of pieces of image data by imaging a target in the plurality of different light emission states, and generating image data to be used for the image measurement on the basis of the plurality of pieces of acquired image data and a generation condition defined in association with each of the plurality of partial regions which include a plurality of adjacent pixels in the image data, wherein an image corresponding to the image data includes a plurality of partial regions which correspond to parts of a field of imaging view of the imaging, generating partial region image data corresponding to the partial region for each partial region as image data to be used for the image measurement, controlling the plurality of light emitting units according to a second parameter set that defines the plurality of light emission states, and imaging the target in each light emission state, extracting partial image data corresponding to the partial region of a generation target from at least one piece of image data among the plurality of pieces of image data and generating the partial region image data on the basis of the extracted partial image data, specifying a disposition situation of the target from the image data, and comparing the disposition situation of the target specified by the specifying with a disposition situation of a reference target at the time of acquisition of the second parameter set to obtain an amount of movement of the target, and correcting the second parameter set on the basis of the amount of movement.

* * * * *